United States Patent
Upadhyay et al.

(10) Patent No.: US 12,189,383 B2
(45) Date of Patent: Jan. 7, 2025

(54) METHODS AND SYSTEMS FOR ESTIMATING A REMAINING USEFUL LIFE OF AN ASSET

(71) Applicant: Ford Global Technologies, LLC, Dearborn, MI (US)

(72) Inventors: Devesh Upadhyay, Canton, MI (US); Huanyi Shui, Ann Arbor, MI (US); Dimitar Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 478 days.

(21) Appl. No.: 17/446,708

(22) Filed: Sep. 1, 2021

(65) Prior Publication Data

US 2023/0068432 A1    Mar. 2, 2023

(51) Int. Cl.
*G05B 23/02*    (2006.01)
*G07C 5/00*    (2006.01)
*G07C 5/08*    (2006.01)

(52) U.S. Cl.
CPC ....... *G05B 23/0283* (2013.01); *G05B 23/024* (2013.01); *G05B 23/0281* (2013.01); *G07C 5/006* (2013.01); *G07C 5/008* (2013.01); *G07C 5/0808* (2013.01)

(58) Field of Classification Search
USPC ...................................................... 701/29.3
See application file for complete search history.

(56) References Cited

U.S. PATENT DOCUMENTS 8,732,112 B2    5/2014  Singh et al.
8,762,165 B2    6/2014  Gilbert et al.
8,831,911 B2    9/2014  Lipowsky et al.
9,544,205 B2    1/2017  Chandrayana et al.
9,881,428 B2    1/2018  Barfield, Jr. et al.
(Continued)

FOREIGN PATENT DOCUMENTS

WO    2010033106 A1    3/2010

OTHER PUBLICATIONS

Upadhyay, D. et al., "Methods and Systems for Anomaly Detection of a Vehicle," U.S. Appl. No. 17/446,707, filed Sep. 1, 2020, 74 pages.

*Primary Examiner* — Todd Melton
*Assistant Examiner* — Vincent Feng
(74) *Attorney, Agent, or Firm* — Joseph Zane; McCoy Russell LLP

(57) ABSTRACT

Methods and systems are provided for monitoring a health of a vehicle component. In one embodiment, a method is provided, comprising dividing a population of vehicles of a connected vehicle population into a plurality of vehicle classes; for each vehicle class of the plurality of vehicle classes, training a class-specific model of the vehicle class to predict a health status variable of a vehicle component included in the vehicle class based on labelled data from historic databases and calibration data; and for each vehicle class of the plurality of vehicle classes, using a first Federated Learning strategy to request local model data from each vehicle of a plurality of vehicles of the vehicle class; receive the local model data from the plurality of vehicles; update the class-specific model based on the received local model data; and send updated parameters of the class-specific model to vehicles included in the vehicle class.

20 Claims, 12 Drawing Sheets

(56) References Cited

U.S. PATENT DOCUMENTS

| | | |
|---|---|---|
| 10,248,490 B2 | 4/2019 | Singh et al. |
| 10,410,440 B2 | 9/2019 | Remboski et al. |
| 10,572,221 B2 | 2/2020 | Webber |
| 10,936,915 B2 * | 3/2021 | Vasisht .................. G06N 3/048 |
| 2008/0004839 A1 | 1/2008 | Papadimitriou et al. |
| 2018/0354525 A1 * | 12/2018 | Lindelöf ............ G06Q 10/0639 |
| 2019/0384257 A1 | 12/2019 | Zhang et al. |
| 2019/0385387 A1 * | 12/2019 | Davidson ................ G07C 5/008 |
| 2020/0182684 A1 | 6/2020 | Yoskovitz et al. |
| 2020/0198651 A1 | 6/2020 | Levy et al. |
| 2020/0311544 A1 | 10/2020 | Ramasamy et al. |
| 2021/0090359 A1 * | 3/2021 | Griffiths ............ B60W 50/0225 |
| 2022/0028263 A1 * | 1/2022 | Ashour .................... H04Q 9/00 |
| 2022/0067667 A1 * | 3/2022 | Mahipal ................. G06Q 10/20 |
| 2022/0068053 A1 * | 3/2022 | Hinduja ............ B60W 50/0205 |
| 2022/0128988 A1 * | 4/2022 | Sawada ................. G05B 13/02 |

\* cited by examiner

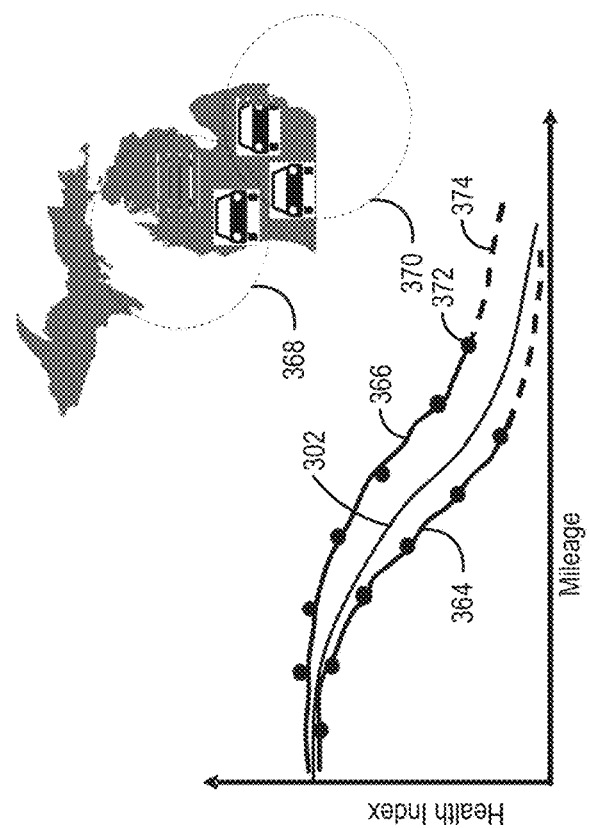
FIG. 3C
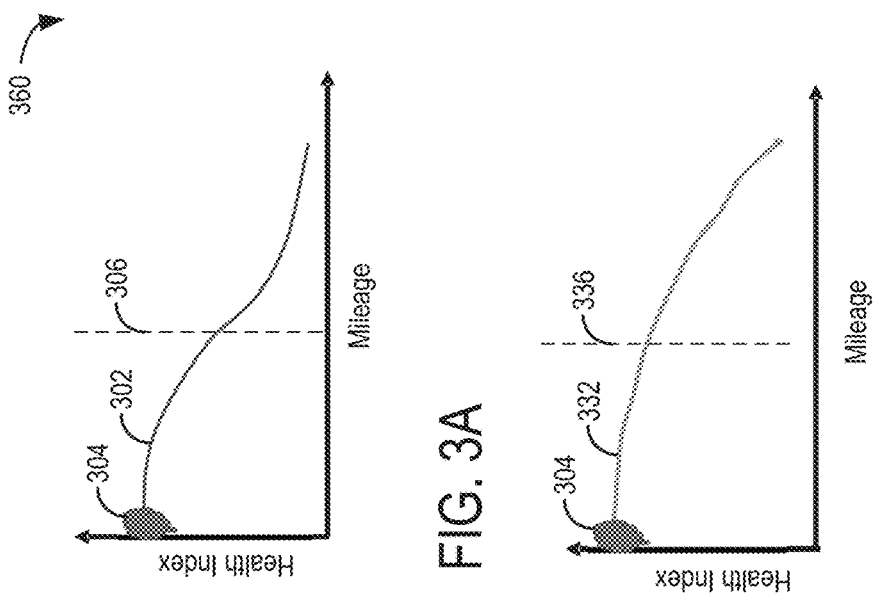
FIG. 3A
FIG. 3B
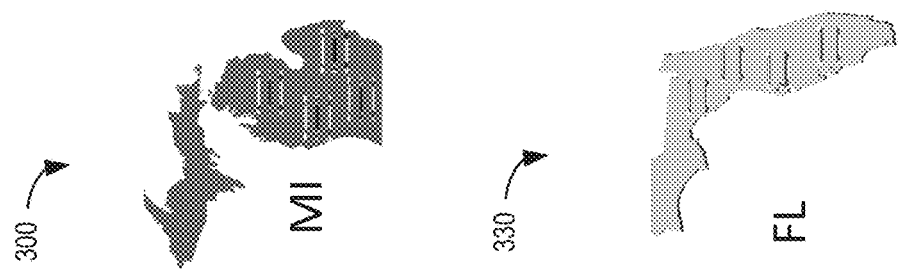

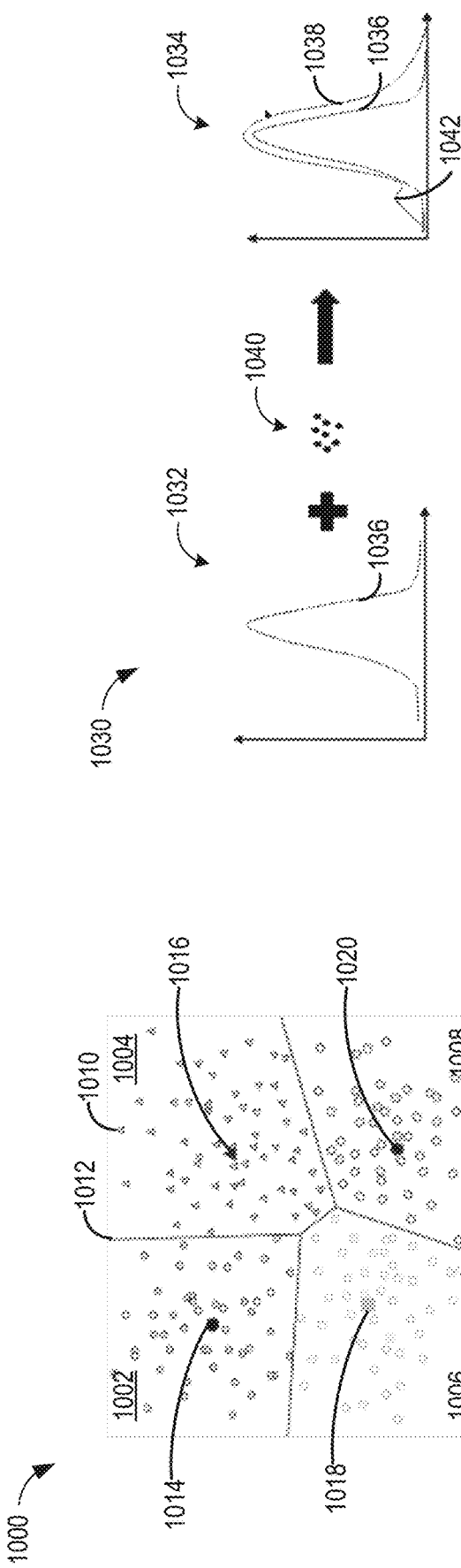

METHODS AND SYSTEMS FOR ESTIMATING A REMAINING USEFUL LIFE OF AN ASSET

FIELD

The present description relates generally to methods and systems for monitoring the health of physical assets, and more specifically, to estimating a remaining useful life of vehicle components.

BACKGROUND/SUMMARY

Predictive maintenance, also known as condition-based maintenance, is a strategy that involves continually monitoring the condition of assets (e.g., vehicle components) to determine maintenance actions needed to be taken at certain times. Prognostics, anomaly detection (AD), and remaining useful life (RUL) prediction systems may continuously monitor the health of the assets, and provide notifications when servicing is recommended. An RUL prediction system may include one or more RUL predictive models that estimate an RUL of an asset based on data of the asset collected over time.

In a traditional vehicle setting, a local RUL predictive model is embedded in the vehicle and relies on local or onboard information to establish asset health status. In a connected vehicle system, the physical assets may also be connected to a cloud-based health monitoring system and to other physical assets via an Internet of Things (IoT) framework, where each asset may transmit to and receive information from the cloud-based health monitoring system and the other assets. A master RUL predictive model may be maintained at a central, cloud-based server, which may make predictions based on received asset population information from a plurality of similar vehicles operating in the field, as well as information from manufacturers, including engineering information, repair information, warranty information, and the like. For example, Barfield et. al in U.S. Pat. No. 9,881,428 teaches predicting potential component degradations in a vehicle by evaluating cloud-based data from a plurality of vehicles.

However, the inventors herein have recognized potential issues with using connected vehicle data to maintain master and local RUL models. Transmitting vehicle component data to the cloud-based server may be costly in terms of bandwidth, may take too much time for applications that rely on low latency inference, and/or may result in data leakages and compromised data privacy.

One option for addressing these issues is to use a distributed learning approach such as Federated Learning (FL) to break a model updating procedure into a plurality of learning sessions, where during each learning session a master RUL model is updated based on data from a randomly selected subset of local RUL models, with updates being propagated to remaining local RUL models over time. However, RUL model accuracy with FL may depend on an independent and identical distribution (IID) of RUL model data, and an implicit heterogeneity of RUL model data due to parameters (weights) of local RUL models varying widely in different operating environments may lead to poor performance. Additionally, training of RUL models may be complicated by a difficulty of obtaining ground truth information, which may only be available periodically when a degradation of a component is detected.

In one example, the issues described above may be addressed by a method, comprising dividing a population of vehicles of a connected vehicle population into a plurality of vehicle classes; for each vehicle class of the plurality of vehicle classes, training a class-specific model of the vehicle class to predict a health status variable of a vehicle component included in the vehicle class based on labelled data from historic databases and calibration data; and for each vehicle class of the plurality of vehicle classes, using a first Federated Learning (FL) strategy to request local model data from each vehicle of a plurality of vehicles of the vehicle class; receive the local model data from the plurality of vehicles; update the class-specific model of the vehicle class based on the received local model data; and send updated parameters of the updated, class-specific model to vehicles included in the vehicle class and further send instructions to retrain local models of the vehicles with the updated parameters.

As one example, a vehicle in a fleet of vehicles may include a fuel injector, and a corresponding local model for predicting an RUL of the fuel injector. A cloud-based health monitoring system connected to the fleet may divide the fleet into a plurality of vehicle classes, where each vehicle class has a class-specific RUL model that predicts the RUL of fuel injectors in the respective vehicle class. The class-specific RUL model may be trained on labelled fuel injector data of the respective vehicle class including ground truth degradation data. As fuel injector degradation data is collected at vehicles of the fleet and the local RUL models are updated accordingly, parameters of the class-specific RUL model of the fuel injector may be updated via an FL strategy, whereby local RUL model data may be iteratively requested from randomly selected portions of vehicles of the respective vehicle class, used to update the parameters of the class-specific RUL model of the fuel injector, which may in turn be sent back to the randomly selected portion of vehicles of the respective vehicle class to update the local RUL models of the fuel injectors of the randomly selected portion of vehicles. The FL strategy may end when local RUL model parameters of a randomly selected portion of vehicles converge with the parameters of the class-specific RUL model. Additionally, a master RUL model of the fuel injectors of the fleet of vehicles may be updated based on the updated parameters of the class-specific RUL models of the plurality of vehicle classes.

In this way, an accuracy of RUL models at a fleet level, a class level, and a vehicle level may all be increased. By increasing the accuracy of the RUL models at a fleet level, a class level, and a vehicle level, fuel injector degradations at vehicles may be more accurately predicted; differences between fuel injector lifetimes of different vehicle classes may be identified, and fuel injector design changes and warranty information at a manufacturer of the fuel injector may be better informed. An additional advantage of the methods and systems disclosed herein is that the fleet of vehicles may be partitioned into the vehicle classes based on either RUL model performance data or vehicle population distribution data, and a topology or number of the vehicle classes may be adjusted as new data becomes available.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A is a graph illustrating a health index of a vehicle component of a first vehicle class.

FIG. 3B is a graph illustrating a health index of a vehicle component of a second vehicle class.

FIG. 3C is a graph illustrating a health index of a vehicle component of different vehicle subclasses of a vehicle class.

FIG. 10A shows an example vehicle population divided into subclasses.

FIG. 10B shows a change in a vehicle population distribution as new samples are added to the population.

DETAILED DESCRIPTION

The following description relates to systems and methods for maintaining and continuously updating remaining useful life (RUL) models of a vehicle component based on data received from a vehicle population. The vehicle population may be a connected vehicle population, where the controller may communicate, via a wireless modem of the vehicle, with a plurality of other vehicles of the connected vehicle population and one or more cloud-based services, such as a cloud-based health monitoring system. As described in greater detail below, the RUL models may be trained and updated based on data received from other vehicles of the connected vehicle population that include the vehicle component.

The RUL models may be created by a manufacturer of the vehicle prior to deployment. A local RUL model may predict an RUL of specific component at a vehicle of the connected vehicle system. The local RUL model may be used to reduce a probability that the asset will degrade in the field, and to estimate when the vehicle should be brought in for servicing. A master RUL model may predict an overall RUL of the vehicle component across the connected vehicle system. The master RUL model may be used, for example, to prepare and manage recall campaigns, inform design changes, optimize fleet maintenance schedules while minimizing fleet downtime and cost of ownership.

Additionally, a class-specific RUL model may predict an RUL of components of vehicles belonging to a vehicle class of the connected vehicle system. For example, due to variations in humidity, a component of a type of vehicle operated in Michigan may degrade at a different rate than a same component of the same type of vehicle operated in Florida. Components may also degrade at a different rate due to driver behavior, traffic patterns, and/or other operational factors. Due to variations in deterioration between vehicles due to factors such as humidity, altitude, road conditions, operating conditions, etc., connected vehicle data over a vehicle population may become unbalanced or skewed over time. Therefore, to maintain and/or increase an RUL prediction accuracy, different class-specific RUL models may be created for different vehicle classes, where a variation in factors leading to deterioration may be minimized within the different vehicle classes. To increase an accuracy of the RUL models, methods are proposed to train and continually update the RUL models based on data received from the connected vehicle system.

Figure 1:
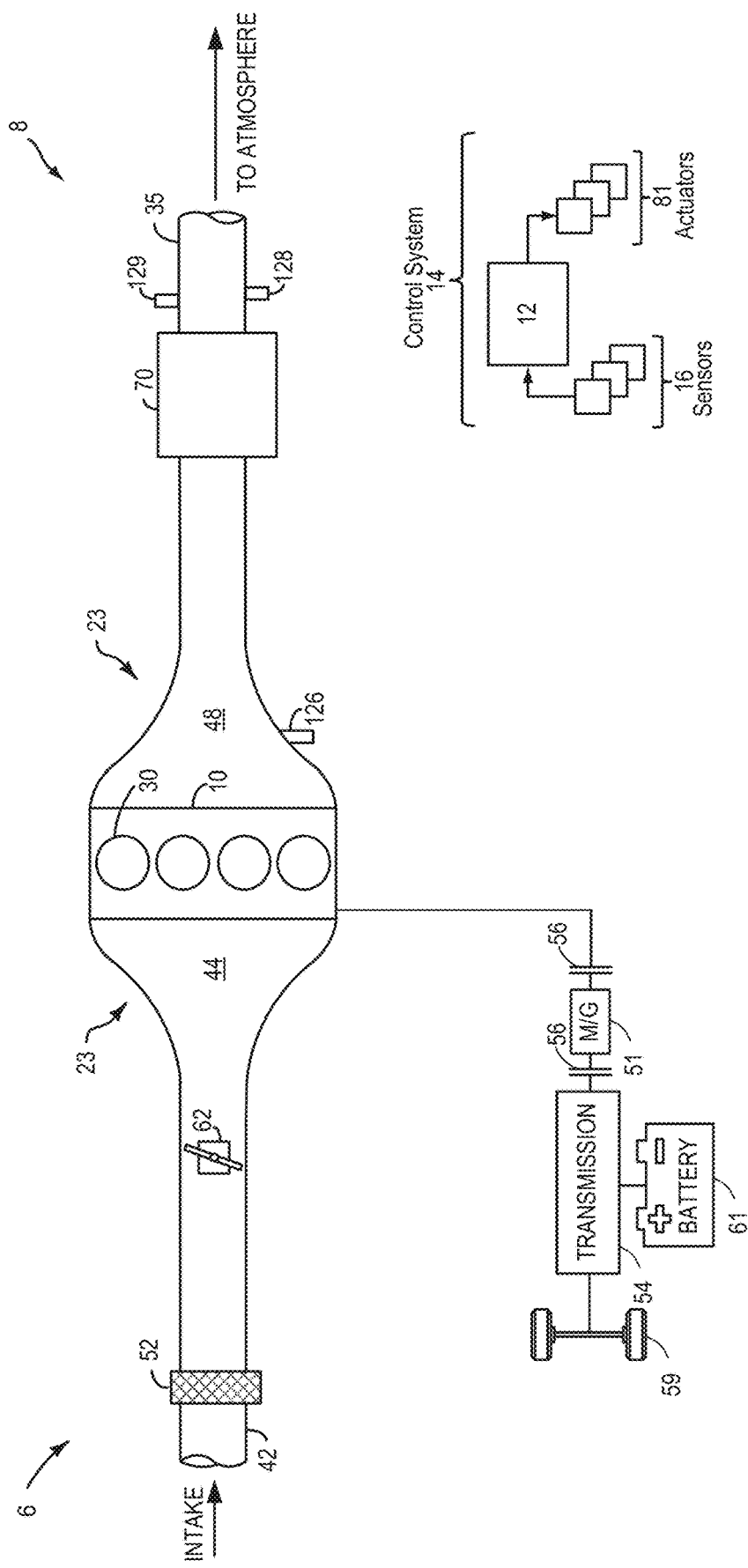
FIG. 1 illustrates a schematic of an engine included in a hybrid vehicle.
Figure 2:
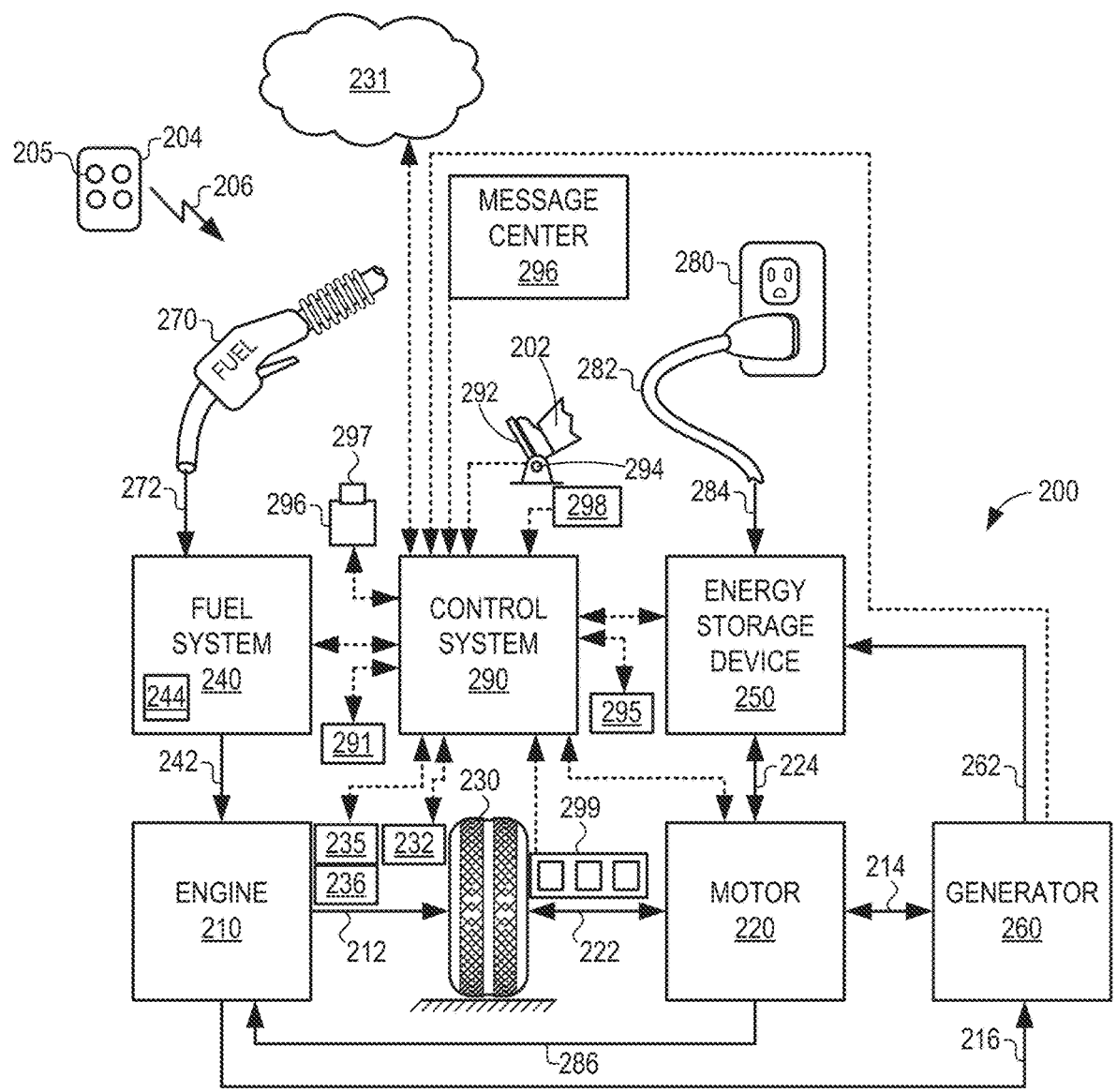
FIG. 2 schematically shows an example vehicle propulsion system.

A vehicle may include an engine, such as the engine depicted in FIG. 1, within a vehicle propulsion system such as the vehicle propulsion system of FIG. 2. A component of the vehicle may have an RUL, which may be updated based on one or more RUL models. The one or more RUL models may be specific to a component of a class and/or subclass of the vehicle, as shown in FIGS. 3A-3C, where the classes and/or subclasses may be based on variables including a geographical location of the vehicle and a driving style of a driver of the vehicle. The one or more RUL models may be updated based on RUL and/or degradation data of the component collected from one or more manufacturing databases and/or a connected vehicle system via a cloud-based RUL server system, such as the RUL server system 401 of FIG. 4, at various points in a lifetime of the component as shown in FIG. 11. The RUL models may be based on vehicle classes, which may be established using a first partitioning method 800 of FIG. 8 or a second partitioning method 900 of FIG. 9, as graphically indicated in FIGS. 10A, 10B, and 10C. The RUL models may be updated based on federated learning, in accordance with a procedure such as the procedure described by method 500 of FIG. 5. An updating of an RUL model may be carried out as shown in FIG. 6. Updating of RUL models may occur during model learning sessions of the federated learning procedure, as described in method 700 of FIG. 7.

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

FIG. 2 illustrates an example vehicle propulsion system 200 which is a non-limiting example of hybrid vehicle system 6 of FIG. 1. Vehicle propulsion system 200 includes a fuel burning engine 210 and a motor 220. As a non-limiting example, engine 210 comprises an internal combustion engine and motor 220 comprises an electric motor. Engine 210 may be a non-limiting example of engine 10 of FIG. 1 and motor 220 may be a non-limiting example of electric machine 51 of FIG. 1. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle with propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 210 to be maintained in an off state (e.g., set to a deactivated state) where combustion of fuel at the engine is discontinued. For example, under select operating conditions, motor 220 may propel the vehicle via drive wheel 230 as indicated by arrow 222 while engine 210 is deactivated, which may herein be referred to as an electric-only operation.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262. In some examples, the engine 210 may deactivate during regenerative braking and traction at the drive wheel 230 may be negative, such that the motor 220 may spin in reverse and recharge the energy storage device 250. Thus, regenerative braking may be distinguished from an electric-only operation, where the motor 220 may provide positive traction at the drive wheel 230, thereby decreasing a SOC of the energy storage device 250 while the engine 210 is deactivated.

During still other operating conditions, engine 210 may be operated by combusting fuel received from fuel system 240 as indicated by arrow 242. For example, engine 210 may be operated to propel the vehicle via drive wheel 230 as indicated by arrow 212 while motor 220 is deactivated, such as during a charge-sustaining operation. During other operating conditions, both engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system or a hybrid propulsion. Note that in some examples, motor 220 may propel the vehicle via a first set of drive wheels and engine 210 may propel the vehicle via a second set of drive wheels.

In other examples, vehicle propulsion system 200 may be configured as a series type vehicle propulsion system, whereby the engine does not directly propel the drive wheels. Rather, engine 210 may be operated by power motor 220, which may in turn propel the vehicle via drive wheel 230 as indicated by arrow 222. For example, during select operating conditions, engine 210 may drive generator 260 as indicated by arrow 216, which may in turn supply electrical energy to one or more of motor 220 as indicated by arrow 214 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

In still other examples, which will be discussed in further detail below, motor 220 may be configured to rotate engine unfueled in a forward (e.g. default orientation) or reverse orientation, using energy provided via energy storage device 250, exemplified by arrow 286.

Fuel system 240 may include one or more fuel storage tanks 244 for storing fuel on-board the vehicle. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 210 as indicated by arrow 242. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors. In some examples, increasing the electrical energy supplied from the energy storage device 250 may decrease an electric-only operation range, as will be described in greater detail below.

Control system 290 may communicate with one or more of engine 210, motor 220, fuel system 240, energy storage device 250, and generator 260. In some examples, control system 290 may be used similarly to controller 12 of FIG. 1. Control system 290 may receive sensory feedback information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory feedback. In some examples, control system 290 may receive an indication of an operator requested output of the vehicle propulsion system from a vehicle operator 202. For example, control system 290 may receive sensory feedback from pedal position sensor 294 which communicates with pedal 292. Pedal 292 may refer schematically to a brake pedal and/or an accelerator pedal. Furthermore, in some examples control system 290 may be in communication with a remote engine start receiver 295 (or transceiver) that receives wireless signals 206 from a key fob 204 having a remote start button 205. In other examples (not shown), a remote engine start may be initiated via a cellular telephone, or smartphone based system where a user's cellular telephone sends data to a server and the server communicates with the vehicle to start the engine.

In some examples, additionally or alternatively, the vehicle propulsion system 200 may be configured to operate autonomously (e.g., without a human vehicle operator). As such, the control system 290 may determine one or more desired operating engine conditions based on estimated current driving conditions.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnect between power source 280 and energy storage device 250. Control system 290 may identify and/or control the amount of electrical energy stored at the energy storage device, which may be referred to as the state of charge (SOC).

In other examples, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 244 may be configured to store the fuel received from fuel dispensing device 270 until it is supplied to engine 210 for combustion. In some examples, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, as described in more detail below, in response to the vehicle operator actuating refueling button 297, a fuel tank in the vehicle may be depressurized so that refueling may be performed.

Control system 290 may be communicatively coupled to other vehicles or infrastructures using appropriate communications technology, as is known in the art. For example, control system 290 may be coupled to other vehicles or infrastructures via a wireless network 231, which may comprise Wi-Fi, Bluetooth, a type of cellular service, a wireless data transfer protocol, and so on. Control system 290 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 290 may be communicatively coupled to other vehicles or infrastructures via a wireless network 231 and the internet (e.g. cloud), as is commonly known in the art. One example of a V2V communication device may include dedicated-short-range-communication (DSRC) network which may allow vehicles within a threshold proximity (e.g., 5,000 feet) to communicate (e.g., transfer information) free of an internet connection.

The wireless network 231 may include one or more computing systems (e.g., servers) including memory and one or more processors. The memory may be configured to store various AD/RUL models as described herein, as well as various data provided thereto, including vehicle operational/sensor data obtained from multiple vehicles. The processor may execute the instructions stored in memory in order to enter the vehicle operational/sensor data into and periodically update the various models, as described below.

Vehicle propulsion system 200 may also include an onboard navigation system 232 (for example, a Global Positioning System) that an operator of the vehicle may interact with. The navigation system 232 may include one or more location sensors for assisting in estimating vehicle speed, vehicle altitude, vehicle position/location, etc. This information may be used to infer engine operating parameters, such as local barometric pressure. As discussed above, control system 290 may further be configured to receive information via the internet or other communication networks. Information received from the GPS may be cross-referenced to information available via the internet to determine local weather conditions, local vehicle regulations, etc.

In some examples, vehicle propulsion system 200 may include one or more onboard cameras 235. Onboard cameras 235 may communicate photos and/or video images to control system 290, for example. Onboard cameras may in some examples be utilized to record images within a predetermined radius of the vehicle, for example. The onboard cameras 235 may be arranged on an exterior surface of the vehicle so that an area surrounding and/or adjacent to the vehicle may be visualized.

Vehicles have components that degrade under a plurality of conditions, and manufacturers may develop models (including RUL and AD models) that predict when vehicle components may degrade. The models may be used to notify the operator so the vehicle may be serviced. However, the thresholds may be based on empirical models tested on new vehicles, or tested under limited conditions, and the like, so the models can result in false positive or false negative determinations of degradation. False positives and false negatives provide inconveniences for the vehicle operator, including but not limited to complete component degradation without notification, consistently incorrect degradation notifications, and frequent repairs. To increase an accuracy of the models, a vehicle population may be divided into a plurality of classes and sub-classes, where a different model may be associated with each class and/or sub-class of the vehicle population. The classes and sub-classes may be based on characteristics of the vehicle or a driver of the vehicle, including vehicle make, model, year, type, geographical location, driving style, etc.

For example, referring to FIG. 3A, a first health index graph 300 shows a health index of a vehicle component in vehicles of a first vehicle class, where the first vehicle class includes vehicles of a particular type or group of types (e.g., pickup trucks, SUVs, a particular make/model SUV, etc.) driven in Michigan. In graph 300, plot 302 shows a first decrease in the health index of the vehicle component as mileage increases, for all vehicles in the first vehicle class. Plot 302 may show an average health index of the vehicle component across all vehicles of the first vehicle class (e.g., similar vehicles including the component that are driven in Michigan), calculated based on data collected from the vehicles of the first vehicle class and stored and processed in a cloud-based health maintenance system 304. For vehicles driven in Michigan, the component may experience extreme temperature and/or weather differences between winter and summer. As a result of the extreme weather differences, the health index of the vehicle component in the first vehicle class may decrease rapidly in a middle portion 306 of an average useful life of the vehicle component.

FIG. 3B shows a second health index graph 330, indicating a health index of an identical component in a vehicle of a second vehicle class, where the second vehicle class includes vehicles of the particular type or group of types that are driven in Florida. In graph 330, plot 332 shows a second decrease in the health index of the vehicle component as mileage increases, for all vehicles in the second vehicle class. Plot 302 may show the average health index of the vehicle component across all vehicles of the second vehicle class, calculated based on data collected from the vehicles of the second vehicle class and stored and processed in the cloud-based health maintenance system 304. For vehicles driven in Florida, the component may not experience extreme temperature and/or weather differences between winter and summer. As a result of not experiencing the extreme weather differences, the health index of the vehicle component in the second class may decrease rapidly in a middle portion 336 of the average useful life of the vehicle component. Thus, due to differences in component degradation based on geographical location, a first model may be used to predict an RUL of the vehicle component of the first vehicle class, while a second model may be used to predict an RUL of the vehicle component of the second vehicle class.

In FIG. 3C, a third health index graph 360 shows the plot 302 of FIG. 3A, of the first vehicle class corresponding to vehicles driven in Michigan, with two additional plots 364 and 366. The two additional plots 364 and 366 may show the average health index of the vehicle component across vehicles of different sub-classes of the first vehicle class. For example, the first vehicle class may be further divided into a first sub-class 368 and a second sub-class 370 based on a driving style of drivers of the vehicles in the first vehicle class. The first sub-class 368 may include drivers who have an aggressive or impatient driving style, while the second sub-class 370 may include drivers who have a cautious driving style. Thus, plot 364 may show the average health index of the vehicle component of vehicles of the first sub-class 368 over an average mileage of the vehicles of first sub-class 368, while plot 366 may show the average health index of the vehicle component of vehicles of the second sub-class 370 over an average mileage of the vehicles of second sub-class 370. As can be seen by plots 364 and 366, throughout a useful life of the vehicle component, the health index of the vehicle component may be maintained at a higher level for vehicles of the second vehicle sub-class 370 (e.g., the cautious drivers) than the first vehicle sub-class 368 (e.g., the aggressive drivers). As a result, different RUL or AD models may be used for the second vehicle sub-class 370 and the first vehicle sub-class 368.

Each of the plots 302, 364, and 366 may be generated from a plurality of individual data points 372, where each individual data point 372 may be an assessment of a health index of a component of an individual vehicle of the corresponding vehicle class or subclass. A dashed portion of each plot, such as the dashed portion 374 of plot 366, may indicate a predicted health index for the component of the vehicle class/sub-class when no individual data points 372 are available.

In this way, a different RUL model may be assigned to each combination of vehicle class and vehicle sub-class. For example, a first RUL model may be assigned to the first sub-class 368 of the first vehicle class (e.g., representing aggressive drivers in Michigan); a second RUL model may be assigned to the second sub-class 370 of the first vehicle class (e.g., representing cautious drivers in Michigan); a third RUL model may be assigned to the first sub-class 368 of the second vehicle class (e.g., representing aggressive drivers in Florida); and a fourth RUL model may be assigned to the second sub-class 370 of the second vehicle class (e.g., representing cautious drivers in Florida). By maintaining and updating different RUL models for each vehicle class and sub-class, more accurate RUL predictions may be made for each vehicle class and sub-class.

Figure 4:
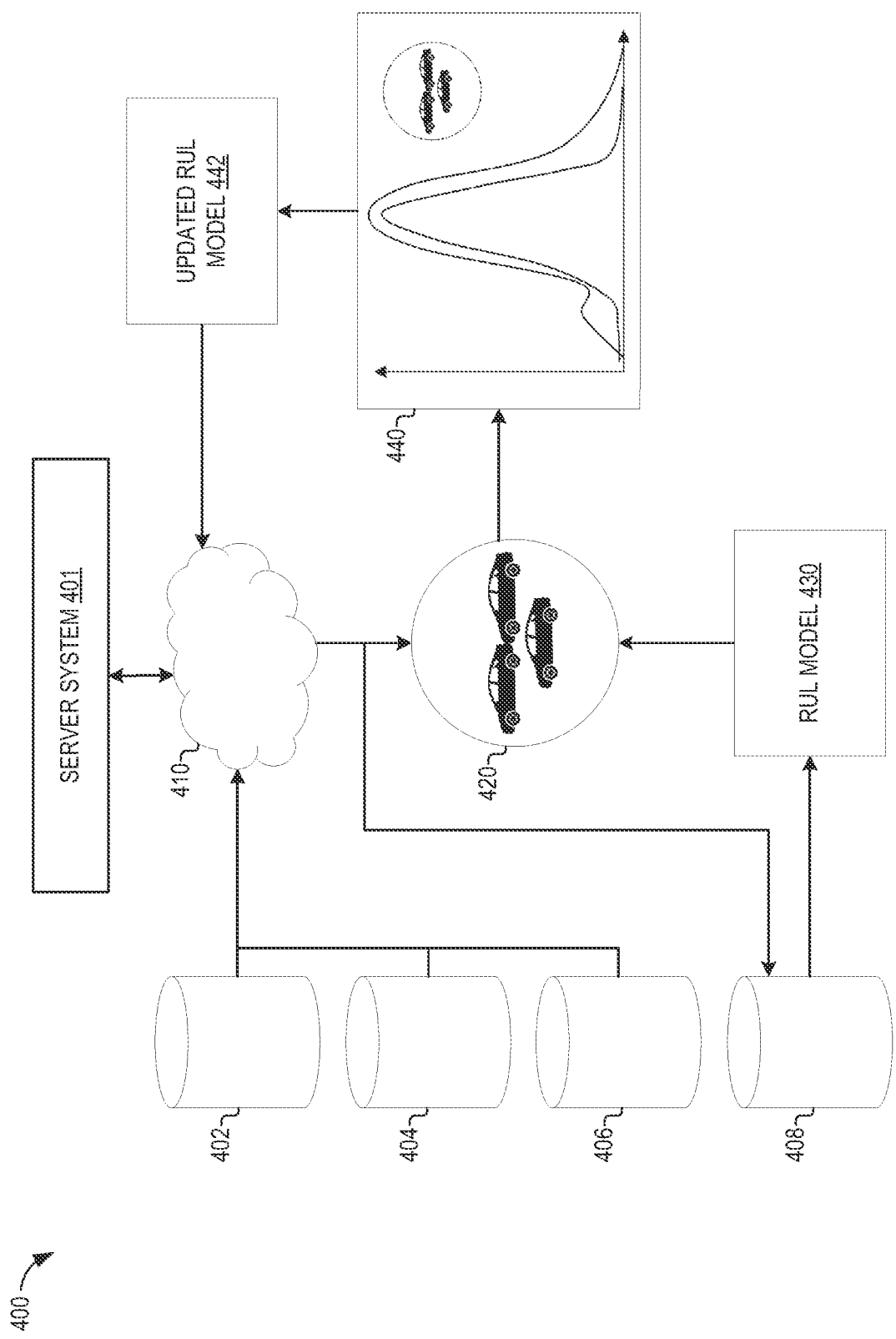
FIG. 4 illustrates an example system for updating RUL models utilizing connected vehicle data.

Turning now to FIG. 4, a system 400 is shown for RUL prediction leveraging connected vehicle data and resources from a cloud network 410. System 400 may facilitate more accurate RUL modeling by updating RUL models when new data is received, thereby reducing false positives and false negatives. When the RUL models of system 400 are applied to local vehicle components, vehicle operators may receive more accurate information regarding the health of vehicle components in the local vehicle, which may lead to a reduction in repair costs over time.

System 400 includes a server system 401. Server system 401 may include resources (e.g., memory, processor(s)) that may be allocated to store a plurality of RUL models and store and execute instructions in order to update one or more of the RUL models based on vehicle data collected from a plurality of vehicles. Server system 401 may include a communication module, memory, and processor(s) (not shown in FIG. 4) to store and update the RUL models described herein. The communication module may facilitate transmission of electronic data within and/or among one or more systems. Communication via the communication module can be implemented using one or more protocols. The communication module can be a wired interface (e.g., a data bus, a Universal Serial Bus (USB) connection, etc.) and/or a wireless interface (e.g., radio frequency, infrared, near field communication (NFC), etc.). For example, the communication module may communicate via wired local area network (LAN), wireless LAN, wide area network (WAN), etc. using any past, present, or future communication protocol (e.g., BLUETOOTH™, USB 2.0, USB 3.0, etc.).

The memory may include one or more data storage structures, such as optical memory devices, magnetic memory devices, or solid-state memory devices, for storing programs and routines executed by the processor(s) of the server system 401 to carry out various functionalities disclosed herein. The memory may include any desired type of volatile and/or non-volatile memory such as, for example, static random access memory (SRAM), dynamic random access memory (DRAM), flash memory, read-only memory (ROM), etc. The processor(s) may be any suitable processor, processing unit, or microprocessor, for example. The processor(s) may be a multi-processor system, and, thus, may include one or more additional processors that are identical or similar to each other and that are communicatively coupled via an interconnection bus.

System 400 includes one or more databases storing data that may be used for initializing and then updating one or more RUL models. As shown, system 400 includes a first database 402, a second database 404, and a third database 406. In an embodiment, first database 402 is an engineering database, storing manufacturing data about vehicle components, including but not limited to component historical data, vehicle historical data, and manufacturer default data for predictive models. In an embodiment, second database 404 is a warranty database, storing warranty data about vehicle components, including but not limited to expected lifespan data, RUL time data, and historical warranty data. In an embodiment, third database 406 is a dealership and repairs database, storing data about vehicle components, including but not limited to component repair frequency data, component health data before and after repairs, and dealership test drive data. The databases may include cause and effect data as it relates to vehicle component RUL prediction to aid predictive models in monitoring vehicle component health. Additionally or alternatively, more or fewer databases may be used in RUL prediction for vehicle components. In alternate embodiments, databases 402, 404, and 406 may include different types of data such as driver behavior data and/or geographical data.

Server system 401 may aggregate the data from databases 402, 404, and 406 to assess preliminary or base predictive models that may be developed based on initial testing data and historical data from developers and manufacturers and stored or deployed by the server system 401. The server system 401 may compare a performance of the base predictive models to current connected vehicle data to detect new data behaviors, emerging trends in component data, and the like. The server system 401, via a network 410, may communicate data, including but not limited to the base predictive models and aggregated data from databases 402, 404, and 406, over the air to update vehicle systems in a connected vehicle population and to update a development database 408.

The development database 408 may store updates to the deployed models and manufacturers may receive updates from the development database 408. Development database 408 may store vehicle component data from one or more pluralities of vehicle populations in a connected system, such as via network 410. In one example, development database 408 represents a plurality of databases from different manufacturers. A vehicle may include components from multiple manufacturers, in which each manufacturer has a database of components. Development database 408 may further store data that predictive model developers use to develop and update RUL models, as well as storing the models themselves. Using the data from development database 408, developers may generate a plurality of RUL models, including but not limited to empirical models, physical models, and machine learning models. The models and initial metrics may be tested using known test cases, conditions, and noise factors. When developers are using data from development database 408 to update RUL models, data relating to repairs, warranties, recalls, fines, and the like may be used to test the updated models for redeployment.

The server system 401, databases 402, 404, and 406, the development database 408, and a plurality of vehicles 420 may communicate over a suitable network, such as network 410. Further, one or more of the devices described herein may be implemented over a cloud or other computer network. For example, server system 401 is shown in FIG. 4 as constituting a single entity, but it is to be understood that server system 401 may be distributed across multiple devices, such as across multiple servers.

An example of a deployed RUL model (e.g., deployed on one or more of the plurality of vehicles 420) is visually represented in FIG. 4 as deployment RUL model 430, which may be modeled upon initial deployment of models from the development database 408. For example, RUL model 430 may be created for a fuel injector, in which historical data of the fuel injector in a connected vehicle population is modeled against manufacturer data for the fuel injector to predict an RUL of the fuel injector. The RUL model 430 may then be deployed to the vehicles that correspond to the components with predictive models for health monitoring.

Server system 401 may receive updates of data aggregated from the plurality of vehicles 420. The aggregated data may be used to update master and/or class-specific RUL models of vehicle components. Distribution data 440 is a visualization of exemplary aggregated data. Distribution data 440 may be used to update an RUL model, as will be described in more detail below. The server system 401 may be configured to modify the distribution data 440 as new data is aggregated, and if the distribution data 440 indicates that an RUL model is inaccurate, the server system 401 may update the corresponding RUL model. Changes in distribution data 440 may be represented in an updated RUL model 442.

The updated RUL model 442 may be distributed to the plurality of vehicles 420 and/or development database 408 via the network 410. It should be appreciated that the distribution data 440 is visually represented to aid in clarity of discussion of the distribution data 440, and that the distribution data 440 may take on other forms without departing from the scope of the disclosure. Further, while the distribution data 440 and updated RUL model 442 are shown separately from the server system 401, it should be understood that the distribution data 440 and updated RUL model 442 may be stored on the server system 401, any of the databases disclosed herein (e.g., databases 402, 404, 406, development database 408), and/or combinations thereof.

Figure 5:
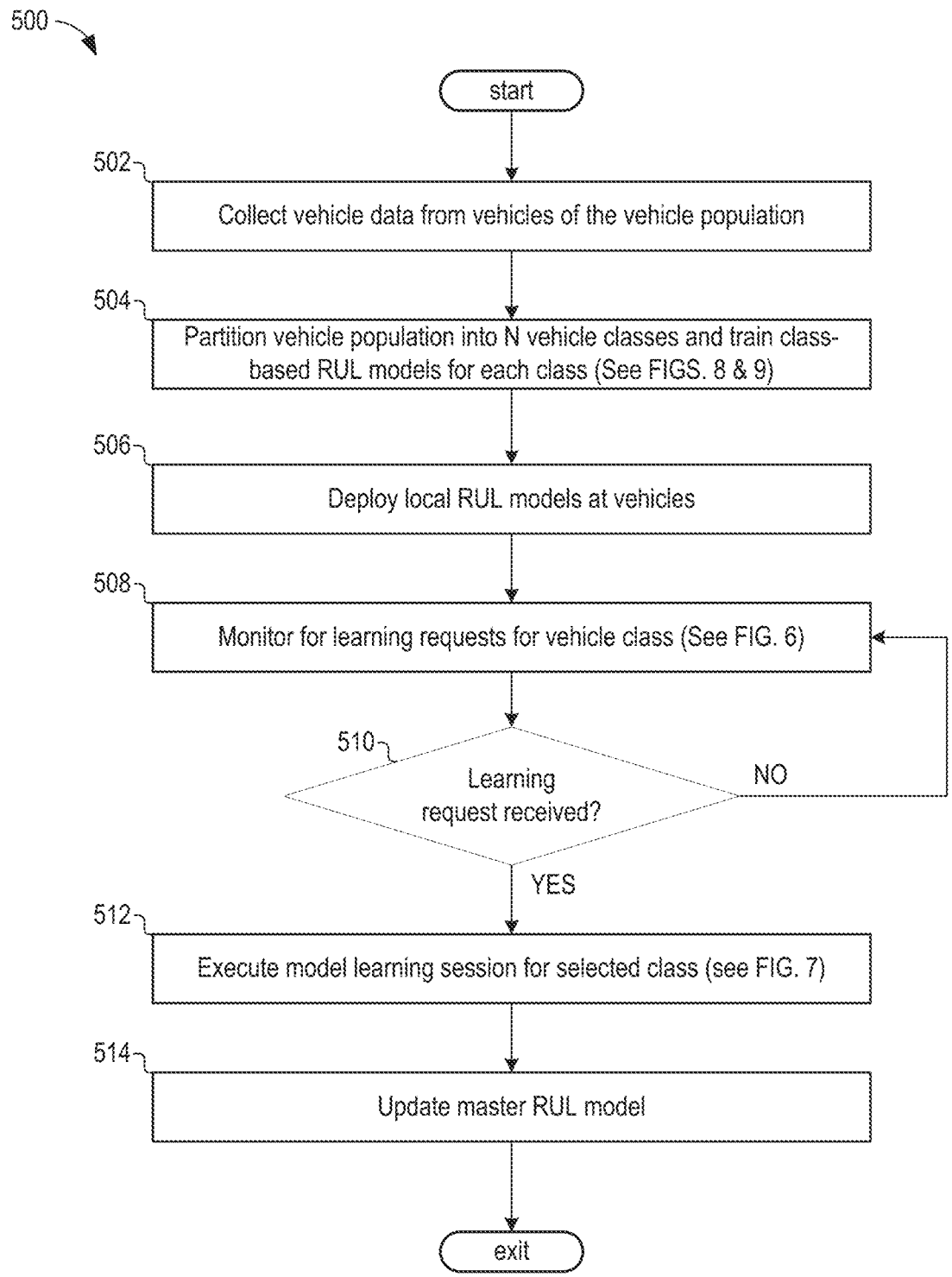
FIG. 5 is a flowchart that illustrates an exemplary high-level method for updating RUL models using federated learning, based on connected vehicle data.
Figure 6:
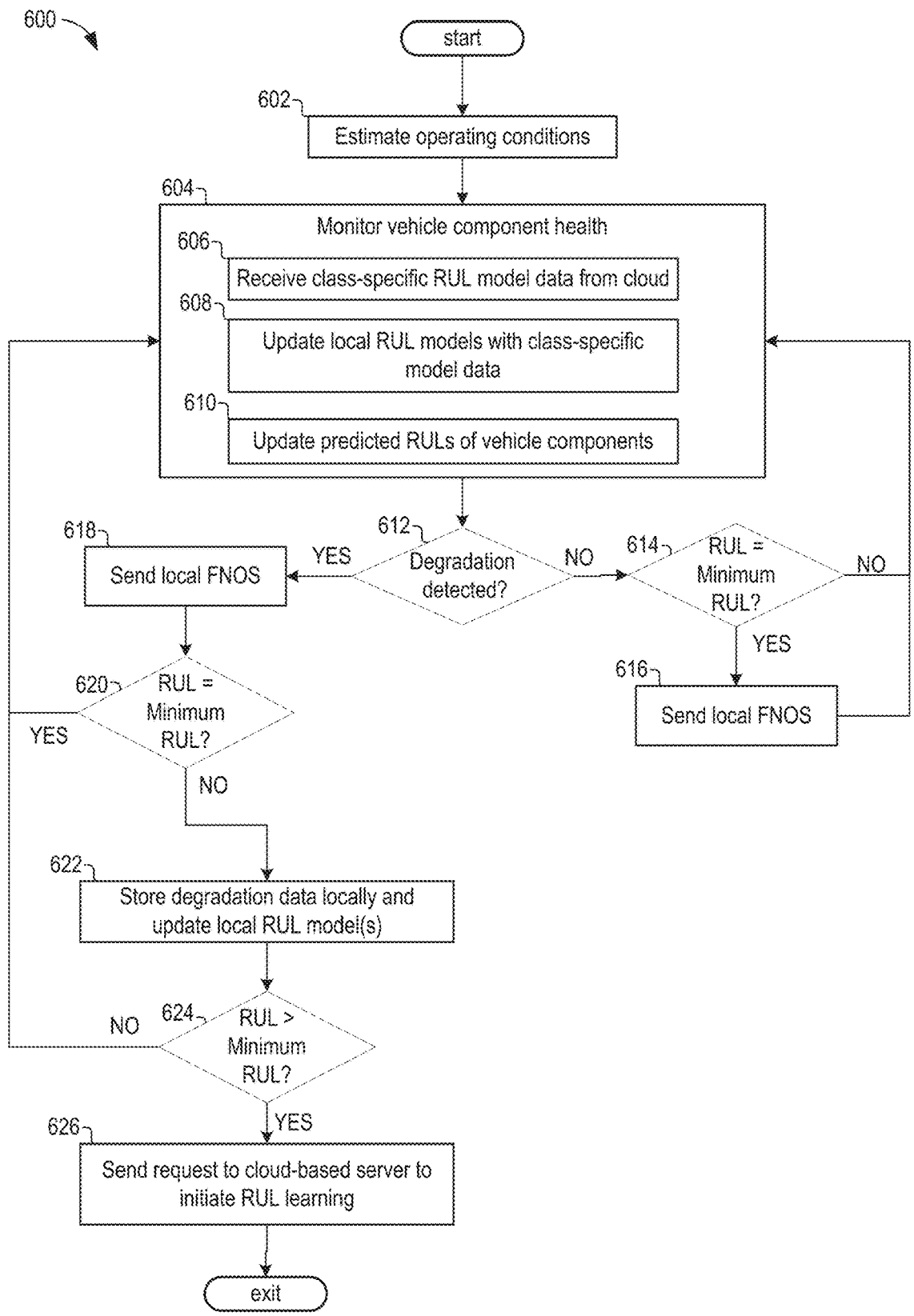
FIG. 6 is a flowchart that illustrates an exemplary method for updating an RUL model of a vehicle component.

Turning now to FIG. 5, an example method 500 is shown for developing and updating RUL models to monitor vehicle component health using federated learning, where connected data availability is assumed. Connected data availability may include communication with a connected vehicle population or a plurality of databases and/or servers using a V2V network, a V2I network, a cloud network, and the like. Instructions for carrying out at least part of method 500 may be stored on and executed by a cloud-based health monitoring system, such as server system 401 of FIG. 4.

At 502, method 500 includes collecting vehicle data from a plurality of vehicles of the connected vehicle population. The vehicle data may be used to establish distinct vehicle classes and may include historic data and calibration data of the vehicle. For example, the vehicle data may include manufacturer and/or vehicle taxonomy data (e.g., from engineering database 402 of FIG. 4), such as make, model, powertrain, drive line, wheel base, and the like. The manufacturer data may include engineering data and operating region conditions, which may further include ambient temperature, humidity, traffic patterns, altitude, and the like. The vehicle data may include a size, shape, and/or dimensions of the vehicle, or any other vehicle information.

At 504, method 500 includes partitioning the connected vehicle population into a plurality of vehicle classes based on the vehicle data and training class-specific RUL models for each vehicle class of the N vehicle classes. Each vehicle class of the plurality of vehicle classes may include vehicles with similar characteristics and/or components, where members of the vehicle class share the similar characteristics and/or components and members of other vehicle classes do not share the characteristics and/or components.

Partitioning of the connected vehicle population into vehicle classes training class-specific RUL models for each vehicle class may be carried out in various ways. In some embodiments, the connected vehicle population may be partitioned based on one or more clustering methods, as described in greater detail below in reference to FIG. 8. In other embodiments, the connected vehicle population may be partitioned based on an unsupervised learning algorithm, as described in greater detail below in reference to FIG. 9. As new vehicle components and new vehicles are added to the connected vehicle population, the connected vehicle population may be repartitioned to add, remove, or adjust boundaries of the vehicle classes.

At 506, method 500 includes deploying local RUL models at each vehicle of the connected vehicle population. In some embodiments, the local RUL models may be copies of a class-specific RUL model of an associated vehicle class of the connected vehicle population, which may be initialized with pre-deployment calibrations. The pre-deployment calibrations may be determined based on information compiled from known use cases and historical/statistical data associated with the vehicle component of the local RUL model. For example, as described above in reference to FIG. 4, the historical/statistical data may include research and engineering data, manufacturer default data, warranty data, repair/dealership data, test data and test drive data, etc.

As an example, each vehicle of a first vehicle class may have a first local RUL model corresponding to a specific fuel injector of a first type of the vehicle, and each vehicle of a second vehicle class may have a second local RUL model corresponding to a specific fuel injector of a second type of the vehicle. The first local RUL model may be the same as or substantially similar to a first class-specific RUL model of the first vehicle class, and the second local RUL model may be the same as or substantially similar to a second class-specific RUL model of the second vehicle class. More specifically, the first local RUL model of the first vehicle class may be identical to the first class-specific RUL model, but may include local parameters which may be updated locally, and the second local RUL model of the second vehicle class may be identical to the second class-specific RUL model, but may include local parameters which may be updated locally. Thus, the first local RUL model of the first vehicle may be occasionally or periodically modified based on a performance of a fuel injector specific to the first vehicle (e.g., of the first type of fuel injector), and the second local RUL model of the second vehicle may be occasionally or periodically modified based on a performance of a fuel injector specific to the second vehicle (e.g., of the second type of fuel injector).

At 508, method 500 includes monitoring data streams of the connected vehicle population for requests to initiate FL. Monitoring the data streams of the connected vehicle population may include monitoring detection of degradations of a plurality of different vehicle components over a total population of vehicles of the connected vehicle population and/or subpopulations of vehicles within the total population of vehicles, where each subpopulation corresponds to a vehicle class. For example, a vehicle system (e.g., an engine system, a fuel system, etc.) of a vehicle of the total population of vehicles may include a plurality of components, where the plurality of components may be modeled by a corresponding plurality of local RUL models corresponding to the vehicle class of the vehicle.

As the connected data streams are monitored for detection of degradations, degradation data of the component may be periodically received at various vehicles of the connected vehicle population and the vehicle classes within the connected vehicle population. The degradation data may include information about a total degradation (e.g., a complete failure of the vehicle component), such as, for example, a date and time of the total degradation, operating conditions at the time of the total degradation, and so forth. The degradation data may also include sensor data relating to a total or partial degradation. For example, sensor readings of the vehicle at a time of a total degradation may be collected as contextual information with respect to the total degradation, or sensor readings of the vehicle component may be collected that indicate a partial degradation of the vehicle component.

In some examples, degradation data may be received when a driver is sent a first notice of service (FNOS) and brings a vehicle in for servicing, and a vehicle component is inspected and/or replaced. A potential degradation indicated by one or more sensors of the vehicle may be verified (e.g., a true positive), or the degradation may not be verified (e.g., a false positive). In another example, the degradation data may be received when a driver is notified and does not bring a vehicle in for servicing, and a total degradation of the component occurs in the field. The total degradation of the component may occur when the RUL of the component is close to 0 (e.g., a true negative), or the total degradation of the component may occur when the RUL of the component is greater than or less than 0 (e.g., a false negative). Thus, as degradation data is aggregated, a performance of the local RUL models may be evaluated. When the degradation data indicates that an accuracy of a local RUL model of a component is high, the local RUL model may not be adjusted. When the degradation data indicates that an accuracy of the local RUL model is not high, the local RUL model may be adjusted. Processing the degradation data and updating the local RUL model is described in greater detail below in reference to FIG. 6.

When a degradation of a vehicle component occurs in a vehicle, or when a threshold amount of the degradation data is collected by the vehicle, a controller of the vehicle may send a learning request (e.g., a request for class-based model parameters to be relearned) to the cloud-based health monitoring system to update the class-specific RUL model of the component associated with the vehicle class of the vehicle, based on the degradation data collected at the vehicle. Updating of the class-specific RUL model may be carried out via an FL strategy, as described below.

At 510, method 500 includes determining whether a learning request has been received. If at 510 it is determined that a learning request has not been received, method 500 proceeds back to 508 to continue monitoring for learning requests. If at 510 it is determined that a learning request has been received, method 500 proceeds to 512.

At 512, method 500 includes executing an FL learning session for a selected vehicle class. Within a federated learning framework, parameters of locally trained models (e.g., the local RUL models) are aggregated by a centralized server (e.g., at the cloud-based health monitoring system) and sent back to the locally trained models as updates, resulting in local models that are more accurate and that have improved generalization capabilities. In particular, FL may be used to isolate drift in models caused by variance in deterioration of a modeled component across a vehicle population. Executing the FL learning session for the selected vehicle class is described below in reference to FIG. 7.

At 514, method 500 includes updating a master RUL model of the vehicle component. The master RUL of the vehicle component may be a master RUL model applicable to the entire connected vehicle population. The master RUL model may be used, for example, to inform a warranty policy of the vehicle component and/or vehicle, or to inform design changes in the manufacture of new vehicle components, or for other research and/or testing purposes.

In some embodiments, parameters of the master RUL model may be established and/or updated based on parameters of the class-specific RUL models, as described below in reference to FIG. 8, while in other embodiments, the master RUL model may be pre-trained on an initial training dataset including labeled data with ground truth degradation data of the vehicle component from the entire connected vehicle population. However, training of the master RUL model based on labeled data from the entire connected vehicle population may result in poor performance of the master RUL model, due to wide variation in vehicle component performance across the connected vehicle population. Additionally, sufficient ground truth labeled data may not be available and/or may be slow and/or difficult to accumulate. Ground truth data such as component degradation data may be received after long delays, for example, through dealerships or warranty claims. A part may be deemed healthy until a degradation is detected, and a transition from healthy to degraded may be sudden and without advance notice. As a result of an insufficiency of labeled ground truth data, training of the master RUL model may be continued over time via an FL strategy. The FL strategy used to train the master RUL model may be similar to the FL strategy used to train the class-specific RUL models described in FIG. 7.

However, while the FL strategy used to train the class-specific RUL models may generate learning federations from a population of vehicles of a vehicle class, the FL strategy used to train the master RUL model may include creating one or more learning federations from vehicles of the connected vehicle population in accordance with one or more sampling strategies. In some embodiments, the one or more sampling strategies may include a stratified sampling strategy, where samples are drawn from homogeneous groups of vehicles of the connected vehicle population; or a cluster sampling strategy, where samples are drawn from heterogeneous clusters of the vehicles of the connected vehicle population; or a mixed sampling strategy, where samples are drawn from heterogeneous clusters of a homogeneous group of the vehicles of the connected vehicle population. Further, a plurality of FL sessions may be carried out on a respective plurality of different learning federations.

For example, the master RUL model may be trained in a first FL session carried out on a first learning federation drawn from a homogeneous group of vehicles of the connected vehicle population (e.g., via the stratified sampling strategy), such as vehicles of a particular make and model operating in a first geographic location with high humidity. The master RUL model may be trained in a second FL session carried out on a second learning federation drawn from a heterogeneous group of vehicles of the connected vehicle population (e.g., via the clustering sampling strategy). The heterogeneous group of vehicles may comprise, for example, a random selection of vehicles of the connected vehicle population which may not have similar features. The master RUL model may be trained in a third FL session carried out on a third learning federation drawn from a combination of homogenous and heterogeneous groups of vehicles of the connected vehicle population (e.g., via the mixed sampling strategy), where vehicles of the third learning federation may include vehicles of a specific make and model from a specific geographic location, with a first portion of sample vehicles drawn from a sub-population of aggressively driven vehicles and a second portion of sample vehicles drawn from a sub-population of cautiously driven vehicles. In some embodiments, the first, second, and third FL sessions may be carried out in order, while in other embodiments, the second and/or third FL sessions may be carried out before the first FL session, or in a different order.

By training the master RUL model on a combination of homogeneous groups (where model accuracy may be increased for the homogeneous group) and heterogeneous groups (where model accuracy may be increased across homogeneous groups), the master RUL model may be optimized based on different interests of a manufacturer of the vehicle component. For example, in a first embodiment, the manufacturer may discover that degradations of the vehicle component occur at a much higher rate at a first location than a second location, and may therefore wish to optimize the master RUL model for accuracy on vehicles of the first location.

In a second embodiment, the master RUL model may be optimized for an overall accuracy over the entire connected vehicle population, where training the master RUL model may include averaging parameters of the master RUL model across a plurality of learning federations. For example, a first FL session with a first learning federation may result in a first parameter adjustment of the master RUL model, a second FL session with a second learning federation may result in a second parameter adjustment of the master RUL model, and a third FL session with a third learning federation may result in a third parameter adjustment of the master RUL model. Parameters of the master RUL model may then be updated by averaging the first parameter adjustment, the second parameter adjustment, and the third parameter adjustment, and applying a resulting average parameter adjustment to the parameters of the master RUL model.

In other embodiments, a weighted average parameter adjustment may be applied to the parameters of the master RUL model. For example, an accuracy of the master RUL model may be optimized for the entire connected vehicle population by multiplying one or more of the first parameter adjustment, the second parameter adjustment, and the third parameter adjustment by a corresponding weight value prior to averaging the first parameter adjustment, the second parameter adjustment, and the third parameter adjustment. The weighting of various parameter adjustments may depend on one or more operational or developmental goals of the manufacturer and/or a vehicle fleet manager.

Turning now to FIG. 6, an example method 600 is shown for initiating an FL session of a class-specific RUL model by sending a learning request of an RUL model of a component of a vehicle when connected vehicle data is available. The class-specific RUL model may be associated with a plurality of vehicles belonging to a vehicle class of a connected vehicle population. Instructions for carrying out method 600 may be executed by a controller of the vehicle, such as controller 12 of control system 14 of FIG. 1 and/or the control system 290 of FIG. 2. In one example, method 600 may be executed as part of method 500 described above.

At 602, method 600 includes estimating and/or measuring vehicle operating conditions. For example, the vehicle operating conditions may include, but are not limited to, a status of an engine of the vehicle (e.g., whether the engine is switched on), and an engagement of one or more gears of a transmission of the vehicle (e.g., whether the vehicle is moving). Vehicle operating conditions may include engine speed and load, vehicle speed, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor speed, battery charge, engine torque output, vehicle wheel torque, etc. In one example, the vehicle is a hybrid electric vehicle, and estimating and/or measuring vehicle operating conditions includes determining whether the vehicle is being powered by an engine or an electric motor. Estimating and/or measuring vehicle operating conditions may further include determining a state of a fuel system of the vehicle, such as a level of fuel in the fuel tank, determining a state of one or more valves of the fuel system, etc.

At 604, method 600 includes monitoring a health of vehicle components of the vehicle. Monitoring the health of the vehicle components may include monitoring a status of each vehicle component of the vehicle components to determine if there is a degradation of the vehicle component. The degradation may be a total degradation, where the vehicle component loses function in the field, or the degradation may be a partial degradation, where the component may still function, but at a lower functionality such that a performance of the vehicle is impacted. The total degradation or the lower functionality may be detected by one or more sensors of the vehicle (e.g., the sensors 16 of FIG. 1). For example, a sensor of the one or more sensors may output a performance of the vehicle component, where if the performance of the vehicle component decreases it may be determined that the vehicle component is degraded. In other scenarios, the total degradation or the lower functionality of the vehicle component may be detected by sensors coupled to other components of the vehicle, where if a performance of the other components of the vehicle decrease, it may be determined that the vehicle component is degraded.

At 606, monitoring the health of the vehicle components further includes receiving data of class-specific RUL models of the vehicle components from a cloud-based server, such as the cloud-based server system 401 of FIG. 4. In various embodiments, the data may be sent from the cloud-based server during an FL session initiated as a result of a degraded vehicle component at a different vehicle of the vehicle class, as described in greater detail below in reference to FIG. 7. The data may include parameters of a class-specific RUL model of the degraded vehicle component, an updated class-based RUL of the degraded vehicle component, and/or other information. The updated class-based RUL of the degraded vehicle component may be used to adjust a time to send a first notice of service (FNOS) to a driver of the vehicle, as described in greater detail below.

At 608, monitoring the health of the vehicle components of the vehicle further includes updating local RUL models of the vehicle components as class-specific RUL model data is received. For example, a fuel injector of a different vehicle may degrade in the field. As a result of the fuel injector of the different vehicle degrading in the field, the different vehicle may send a request to the cloud-based server to initiate an FL session. During the FL session, the cloud-based server may update a class-specific RUL model of the fuel injector. When the FL session ends, the cloud-based server may send data of the class-specific RUL model (e.g., the class-specific RUL model, parameters of the class-specific RUL model, an updated class-based RUL of the fuel injector, etc.) to the vehicle. When the data is received at the vehicle, the local RUL model of the fuel injector of the vehicle may be updated based on the data. In some embodiments, the local RUL model may be updated by calculating a weighted average of parameters of the local RUL model and parameters of the class-specific RUL model.

At 610, monitoring the health of the vehicle components further includes updating predicted RULs of the vehicle components. Updating the predicted RULs may include, for example, periodically updating local RUL models with new data and events (e.g. failure or no failure, technician checks, or other reference signals, if any) and/or adjusting the predicted RULs based on a predicted RUL of a class-based RUL model.

At 612, method 600 includes determining whether a degradation of a vehicle component has been detected. If at 612 it is determined that no degradation is detected, method 600 proceeds to 614.

At 614, method 600 includes determining whether the RUL of the component is equal to the minimum RUL of the component, where the minimum RUL of the component may indicate a predicted end of a lifetime of the component. For example, the detected degradation may occur prior to the RUL achieving a minimum RUL of the component, where the degradation is an unexpected early fault of the component. The detected degradation may occur at the minimum RUL of the component, where the degradation is expected in accordance with a relevant RUL model. The detected degradation may occur after achieving the minimum RUL of the component, where a life of the component is longer than predicted by the relevant RUL model.

Referring briefly to FIG. 11, in an embodiment, a graph 1100 of a health index of a component of a vehicle over time is shown. In other embodiments, graph 1100 may show the health index of the vehicle component over a mileage driven by the vehicle during a lifetime of the component, or a number of relevant cycles, or a different parameter that measures a use of the component. In graph 1100, a health index plot 1102 shows a gradual decrease in a predicted RUL of the component from a point 1106 where the component is first deployed as now, to a point where it reaches an end of a lifetime of the component. A minimum RUL of the component is shown by dashed line 1104. An expected lifetime of the component is shown by line 1110, where a degradation occurring at point 1114 (e.g., at time 2) occurs where plot 1102 reaches the minimum RUL shown by dashed line 1104. If a degradation is detected at point 1114, an accuracy of the RUL model may be considered to be high. Alternatively, a degradation may be detected prior to the component reaching the minimum RUL, for example, at point 1108 at time 1. If a degradation is detected at point 1108, an accuracy of the RUL model may be considered to be lower than desired. In another example, a degradation may be detected after the component reaches the minimum RUL, as indicated by line 1112. For example, if a degradation is detected at point 1116, an accuracy of the RUL model may be considered to be lower than desired. In some embodiments where a plurality of RUL models may be associated with the component, when the accuracy of the RUL model is considered lower than desired, a different RUL model predicting a different RUL may be selected as a top-performing model for the purposes of predicting the RUL of the component, and local RUL models may be updated in accordance with the different RUL model.

Returning to FIG. 6, if at 614 it is determined that the RUL of the component is not equal to the minimum RUL of the component, method 600 proceeds back to 604. Alternatively, if at 614 it is determined that the RUL of the component is equal to the minimum RUL of the component, method 600 proceeds to 616. At 616, method 600 includes issuing a first notice of service (FNOS) to a driver of the vehicle to have the vehicle brought in to have the component serviced, and method 600 proceeds back to 604.

Referring back to 612, if at 612 it is determined that a degradation of the component has been detected, method 600 proceeds to 618. At 618, method 600 includes an FNOS to the driver of the vehicle to have the vehicle brought in to have the component serviced.

At 620, method 600 includes determining whether an RUL of the component is equal to a minimum RUL of the component, as described above in reference to 614. If at 620 it is determined that the RUL of the component is equal to the minimum RUL, method 600 proceeds back to 604, where monitoring the health of the vehicle components is continued. If at 620 it is determined that the RUL of the component is not equal to the minimum RUL (e.g., either the component has degraded unexpectedly early, or unexpectedly late), method 600 proceeds to 622.

At 622, method 600 includes storing data of the degradation data locally and updating one or more local RUL models of the component at the vehicle, based on the degradation data. The type of degradation data may depend on the component. As an example, the degradation data may include a time of the degradation, a total lifetime of the component up until the time of the degradation in time, a mileage of the vehicle, a temperature of exhaust gases of the vehicle, a crankshaft velocity of the vehicle, a speed of the vehicle, a fluctuation in engine torque of the vehicle, a state of charge of a battery of the vehicle, and the like.

The one or more local RUL models of the component may be updated with new data (the new data forming a mini batch of training data), and subsequently optimized in accordance with an iterative optimization procedure. The iterative optimization procedure may use a gradient descent algorithm starting at a point $\beta_m$ (learned from each class), to adjust the parameters of a model of the one or more local RUL models based on a gradient of the function with individual historical data, in accordance with the following equation:

$$\beta_m^{new} = \beta_m^{old} - \eta \nabla_{\beta_m} J_m(\beta_m; s_m) \qquad (1)$$

where a loss function $J_m$ is an error between the model and the true system behavior for the mth class. The parameters $\beta_m$ may be updated in an opposite direction of the gradient of the loss function with respect to $\nabla_{\beta_m} J_m$. The step size $\eta$ is an important hyperparameter that determines how fast to converge to a (local) minimum.

In addition to the one or more local RUL models, in some embodiments one or more AD models of the component may be updated locally (e.g., at the vehicle) with the degradation data. In some embodiments, a cloud-based health monitoring system may also be notified, whereby one or more cloud-based AD models may be updated, and/or the degradation data may be relayed to a manufacturer of the component At 624, method 600 includes determining whether the RUL of the component is greater than the minimum RUL of the component (e.g., where the component has degraded earlier than expected). If the RUL of the component is not greater than the minimum RUL of the component (e.g., if the RUL of the component is less than the minimum RUL of the component, meaning that the component has lasted longer than expected), method 600 proceeds back to 604, where monitoring the health of the vehicle components is continued. If the RUL of the component is greater than the minimum RUL of the component, method 600 proceeds to 626.

At 626, method 600 includes sending a request to a cloud-based server to initiate an RUL learning cycle using federated learning. The RUL learning cycle using federated learning is described below in reference to FIG. 7.

Figure 7:
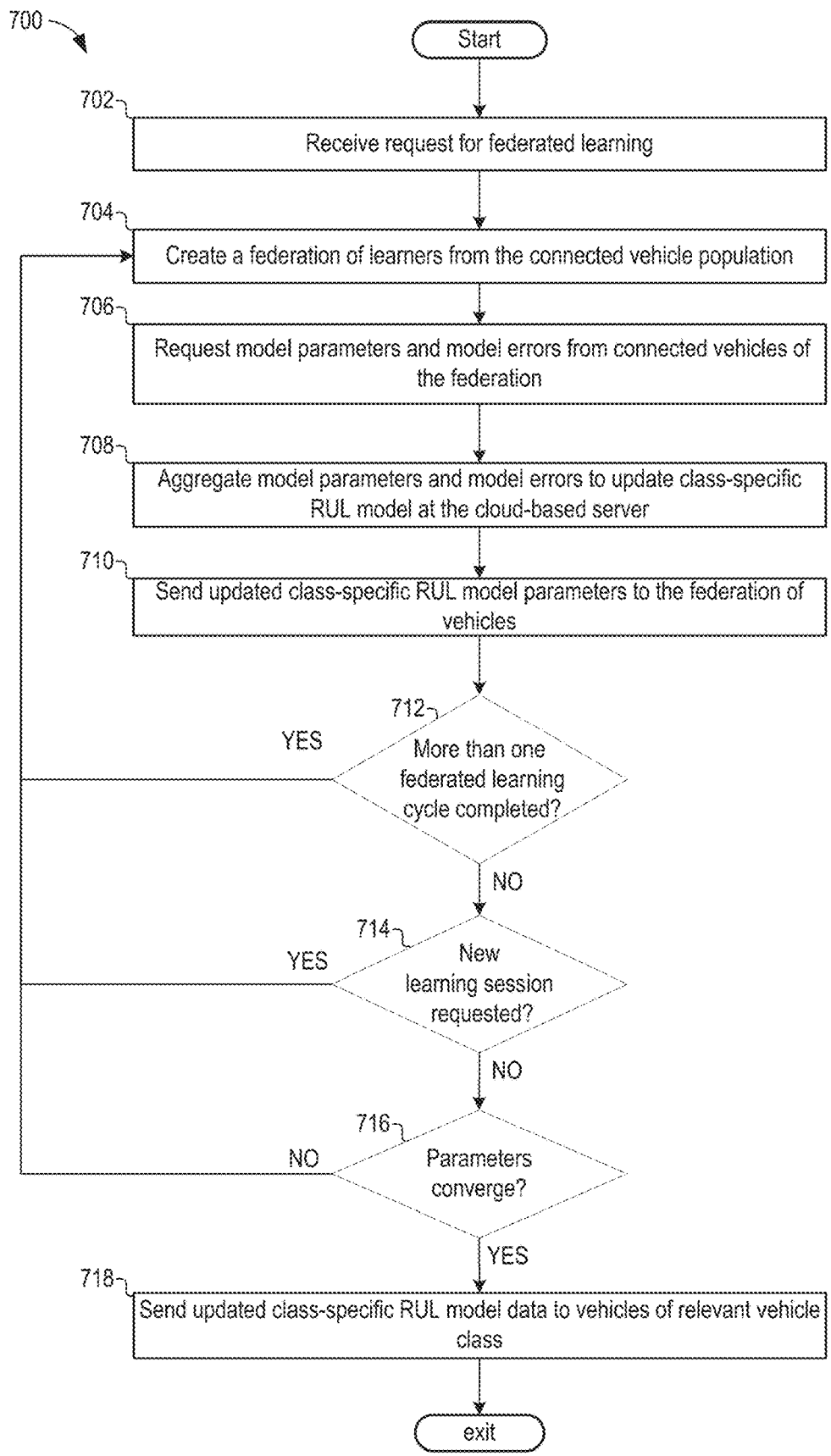
FIG. 7 is a flowchart that illustrates an exemplary method for initiating a new RUL model learning session for a vehicle component.

Turning now to FIG. 7, an exemplary method 700 is shown for updating a trained RUL model of a component of a vehicle via federated learning. In various embodiments, the centralized server may be a cloud-based server, such as server system 401 of FIG. 4. Instructions for carrying out method 700 may be stored on and executed by the cloud-based server. In one example, method 700 is executed as part of method 500 described above.

At 702, method 700 includes receiving a request to initiate a federated learning cycle for the component. The request may be received from a requesting vehicle as a result of a degradation being detected in the component at the requesting vehicle, as described above in reference to FIG. 5.

At 704, method 700 includes creating a learning federation (also referred to herein as the federation) of vehicles from the connected vehicle population. In various embodiments, the federation may comprise a number N of randomly selected vehicles of a vehicle class as the requesting vehicle. For example, 100 vehicles of the connected vehicle population may be randomly selected to create the federation. In some embodiments the federation may include the requesting vehicle, while in other embodiments, the federation may not include the requesting vehicle.

At 706, method 700 includes requesting model parameters from local RUL models of the federation of vehicles. The model parameters may include, for example, model inputs, model outputs, and model error; weights and biases of neural network RUL models; and/or other parameters. In some embodiments, the model parameters may include sensor and event data of the vehicle, as measured via vehicles sensors such as the sensors 16 described above in reference to FIG. 1. The sensor and event data may include degradation data, as described above in reference to FIG. 6, or diagnostic trouble codes (DTC), which may be triggered by one or more diagnostic routines executed by the controller, or other data. In some embodiments, the sensor and event data may be used to establish labeled, ground truth information for supervised learning (SL) or self-supervised learning.

Method 700 may include waiting for a duration to receive responses from the vehicles of the federation. In some cases, a portion of the vehicles of the federation may not respond and/or transmit the model parameters and errors, whereby non-responding vehicles may be eliminated from the federation. In some embodiments, eliminated vehicles may be replaced by other vehicles of the vehicle class.

At 708, method 700 includes aggregating the model parameters and the model errors of the local RUL models from the vehicles of the federation, and updating a class-specific RUL model of the vehicle class at the cloud-based server. Updating the class-specific RUL model may depend on a type of model used. For example, if the class-specific RUL model is a neural network, a plurality of weights of the neural network may be adjusted based on new degradation data. If the class-specific RUL model is a regression model, the regression model may be adjusted to include new data points corresponding to the new degradation data.

In some embodiments, aggregating the model parameters of the local RUL models to update the class-specific RUL model may include averaging the model parameters of the local RUL models. The averaging may also be a weighted averaging, where model parameters of certain local RUL models may be weighted more than other local RUL models (e.g., where some vehicle components exhibit behavior that is more representative of the vehicle class than other vehicle components). In some embodiments, parameters of the class-specific RUL models may be updated as a function of the aggregated and/or averaged local RUL model parameters, while in other embodiments, the parameters of the class-specific RUL models may be replaced by the averaged local RUL model parameters.

At 710, method 700 includes wirelessly transmitting updated model parameters of the class-specific RUL model to vehicles of the federation (e.g., the N randomly selected vehicles of the vehicle class). When the updated model parameters are received at the vehicles of the federation, each vehicle of the federation may update a corresponding local RUL model based on the updated model parameters. In some embodiments, the local RUL model parameters of each vehicle of the federation may be replaced with the updated model parameters. In other embodiments, the local RUL model parameters of each vehicle of the federation may be updated as a function of the updated model parameters (e.g., averaged).

Once the updated model parameters are transmitted to the applicable vehicles, a first federated learning cycle is completed, and method 700 includes determining whether to initiate a subsequent federated learning cycle. Determining whether to initiate a subsequent federated learning cycle may depend on factors including a number of federated learning cycles performed and a convergence of the model parameters over a plurality of federated learning cycles.

At 712, method 700 includes determining whether more than one federated learning cycle has been completed. If only one federated learning cycle has been completed, sufficient data may not be available to establish a convergence of the model parameters. To establish a convergence of the model parameters, at least two federated learning cycles may be completed. If at 712 it is determined that only one federated learning cycle has been completed, method 700 may proceed back to 704, where a new federation is created from the connected vehicle population and a subsequent FL cycle is performed. If at 712 it is determined that more than one FL cycle has been completed, method 700 proceeds to 714.

At 714, method 700 includes determining whether a new FL session has been requested. For example, a component of a first vehicle may experience a first degradation, where in response to the first degradation, a first request is sent to initiate an FL session. In response to receiving the first request from the first vehicle, a first FL session may be initiated in accordance with method 700. During the first FL session, a similar component of a second vehicle may experience a second degradation, where in response to the second degradation, a second request is sent to initiate an FL session. In response to receiving the second request, the first FL session still underway, a second FL session may be initiated, where the second FL session includes degradation data of the second degradation as well as model data of the second vehicle and/or other similar vehicles. Since the second FL session is based on additional and/or more recent model data than the first FL session, in some embodiments, the first FL session may be abandoned. In other embodiments, the first FL session may be carried out to a completion (e.g., a convergence of model data) concurrently with carrying out the second FL session.

If at 714 it is determined that a learning session has been requested, method 700 proceeds back to 704, where a new federation is created from the connected vehicle population and a subsequent federated learning cycle is performed based on updated model parameters included in the request for the new federated learning session. If at 714 it is determined that a learning session has not been requested, method 700 proceeds to 716.

At 716, method 700 includes determining whether the model parameters have converged. Determining whether the model parameters have converged may include determining whether an aggregate change made to the model parameters in accordance with the gradient descent $\nabla_{\beta_m} J_m(\beta_m; s_m)$ from equation (1) has decreased below a threshold value (e.g., a small positive value close to zero).

For example, the connected vehicle population may comprise 1000 vehicles. A federated learning session may be initiated in relation to a vehicle component, starting with a first federated learning cycle based on a first randomly selected federation of 100 vehicles. During the first federated learning cycle, parameters of local models of the vehicle component at the first randomly selected federation of 100 vehicles may be transmitted to a server, and aggregated at the server to perform a first update of a class-specific model at the server. Parameters of the class-specific model may be transmitted back to the first randomly selected federation of 100 vehicles, and the local models of the vehicle component at the first randomly selected federation of 100 vehicles may be updated. During updating of the local models, parameters of the local models may be reset to parameters of the class-specific model and retrained based on local (e.g., historical) data. After updating the local models, the first federated learning cycle may conclude, and a second federated learning cycle of the federated learning session may be initiated based on a second randomly selected federation of 100 vehicles of the 1000 vehicles of the connected vehicle population. During the second federated learning cycle, parameters of local models of the vehicle component at the second randomly selected federation of 100 vehicles may be transmitted to the server, and aggregated at the server to perform a second update of the master model. Updated parameters of the master model may be transmitted back to the second randomly selected federation of 100 vehicles, and the local models of the vehicle component at the second randomly selected federation of 100 vehicles may be updated. After updating the local models, the second federated learning cycle may conclude, and a third federated learning cycle of the federated learning session may be initiated based on a third randomly selected federation of 100 vehicles of the 1000 vehicles of the connected vehicle population, and so on. As successive federated learning cycles are performed, adjustments made to the parameters of the master model may decrease. When the adjustments made to the parameters of the master model, in aggregate, decrease below the threshold value, the model parameters may be considered to have converged. Convergence may also be affected by new requests for federated learning, whereby new model and degradation data may be periodically or continuously received.

At 718, method 700 includes sending updated class-specific RUL model data to all vehicles of the vehicle class of the class-specific RUL model. Over the course of the FL session, parameters of the class-specific RUL model are updated based on parameters of local models of successive randomly selected federations. After a convergence occurs and the FL session ends, a set of final parameters of the class-specific RUL model may be sent to all vehicles of the vehicle class, including vehicles included in one or more randomly selected federations. In this way, all local RUL models of the vehicles of the vehicle class may receive, be updated, and be maintained with a most recent and accurate set of class-specific RUL model parameters. The class-specific RUL model data may include, for example, the class-specific RUL model, parameters of the class-specific RUL model, a class-based predicted RUL of the vehicle component, or other relevant information.

Figure 8:
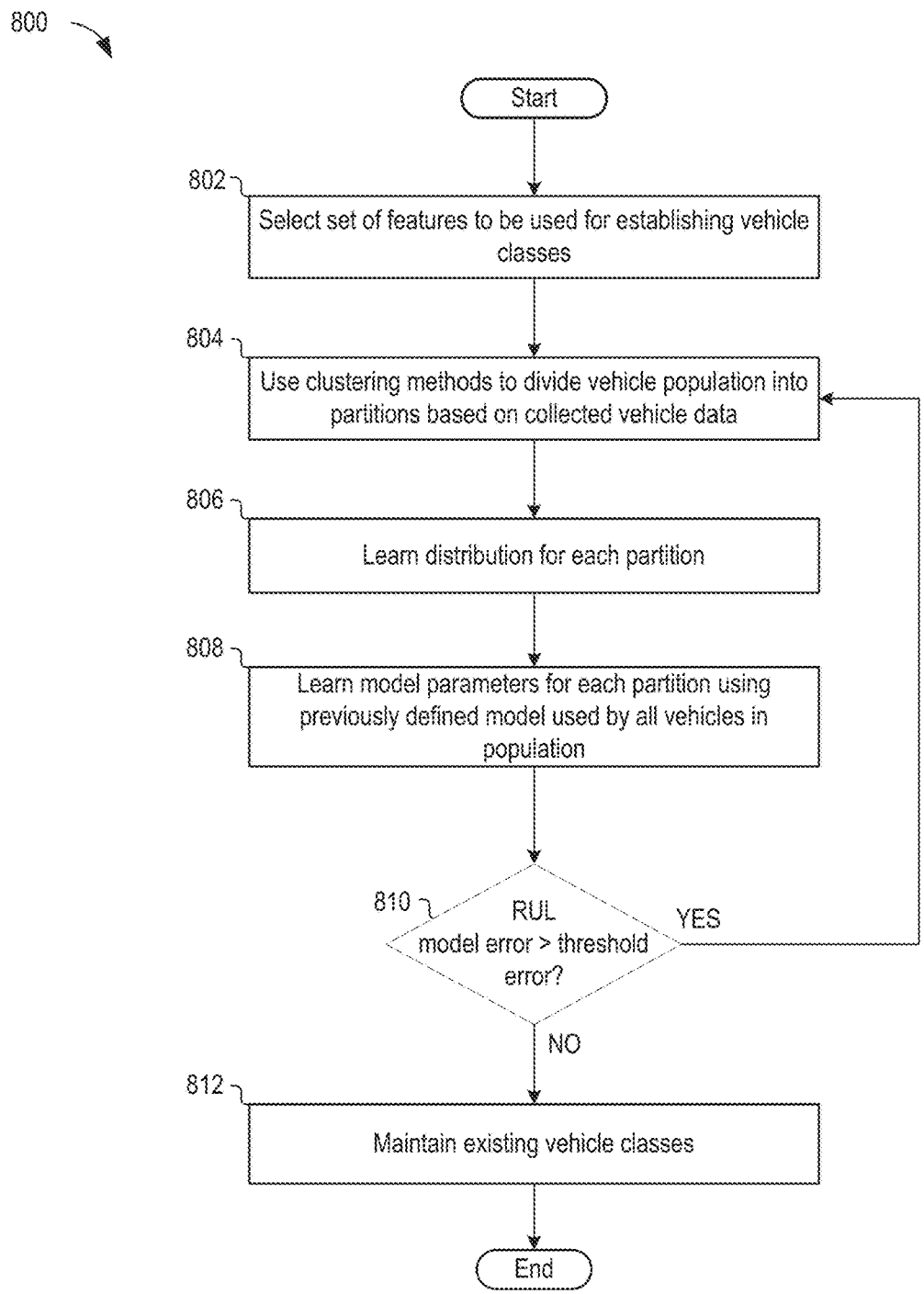
FIG. 8 is a flowchart that illustrates a first exemplary method for partitioning a vehicle population into vehicle classes.

Referring now to FIG. 8, a first exemplary method 800 for partitioning a vehicle population into a plurality of vehicle classes is shown. As described above, by maintaining class-specific RUL models of a component for each vehicle class rather than relying on a master RUL model for the component across all vehicle classes, a performance of a specific component of a vehicle may be modeled more accurately. Instructions for carrying out method 800 may be stored on and executed at a cloud-based server, such as the server system 401 of FIG. 4. Method 800 may be executed as part of method 500 described above.

In various embodiments, the plurality of vehicle classes may be specific to a vehicle component. For example, the vehicle population may be divided into a first set of vehicle classes with respect to a first component; a second set of vehicle classes with respect to a second component; a third set of vehicle classes with respect to a third component, and so on. By creating different sets of vehicle classes for different components, local and master RUL models of a component may be more accurate. In other embodiments, the vehicle population may be divided into a single set of vehicle classes, where vehicle classes may not be specific to a vehicle component. For example, the vehicle classes may be established based on features specific to a vehicle's geometric location and/or a historical driving profile of the vehicle, as opposed to a vehicle component.

At 802, method 800 includes selecting a set of features to be used for establishing vehicle classes with respect to a modeled vehicle component. The set of features may be selected from vehicle data, as collected and described above in reference to FIG. 5. However, not all the vehicle data collected from the connected vehicle population may be relevant to classification of a vehicle component. For example, when establishing vehicle classes with respect to a first vehicle component, a first sensor data relevant to the first vehicle component may be selected. When establishing vehicle classes with respect to a second vehicle component, a second sensor data relevant to the second vehicle component may be selected, where portions or all of the second sensor data and the first sensor data may be different.

Some features of the vehicle data may be relevant to all vehicle classes of all components. For example, a geographical location of a vehicle may be a feature considered in establishing all vehicle classes. As another example, in some embodiments, a model of a vehicle may be relevant to establishing vehicle classes for all components, where one defining feature of a vehicle class of a component may be a model of a vehicle. In other embodiments, the model of the vehicle may not be relevant to establishing vehicle classes for all components. For example, for some components, a type of vehicle may be more useful in establishing vehicle classes than the model of the vehicle. For example, a sedan of a first model may share features with a sedan of a second model, whereby the sedan of the first model and the sedan of the second model may be included in a same vehicle class.

Once a set of features has been selected as described above, parameter vectors may be established for each vehicle including the vehicle component. The parameter vectors may include a number of values corresponding to a size of the set of features, where each value of the number of values corresponds to a feature of the set of features. Thus, a parameter vector of a vehicle may represent the vehicle, and a distance between a first parameter vector of a first vehicle and a second parameter vector of a second vehicle may represent a similarity of the first vehicle to the second vehicle. If the first vehicle is similar to the second vehicle, the first vehicle and the second vehicle may be assigned to a same vehicle class of the connected vehicle population with respect to the vehicle component. Alternatively, if the first vehicle is not similar to the second vehicle, the first vehicle and the second vehicle may be assigned to different vehicle classes of the connected vehicle population with respect to the vehicle component.

At 804, method 800 includes using one or more clustering methods to divide the vehicle population into partitions (e.g., vehicle classes) based on the selected set of features and corresponding parameter vectors. The one or more clustering methods may use a similarity metric, as described above, to determine how the parameter vectors of vehicles of the vehicle population may be divided into natural groupings. In some embodiments, one or more algorithms of the one or more clustering methods may be adjusted to reflect a relative importance of a parameter of the parameter vectors. For example, if an output of a first sensor has a higher importance in modeling a vehicle component than an output of a second sensor, a weight may be multiplied by a value of the parameter. In other embodiments, the relative importance of a parameter of the parameter vectors may be indicated in a different way.

Various clustering methods may be used to cluster the vehicles of the vehicle population into partitions or classes, including but not limited to K-means, self-organizing maps, k-nearest neighbors (KNN), density-based spatial clustering of applications with noise (DBSCAN), Gaussian Mixture Modeling (GMM), distance metrics, and so on. In some embodiments, a clustering method of the various clustering methods may be used to determine a suitable number of vehicle classes to divide the vehicle population into, while in other embodiments, the clustering method may divide the vehicle population into a predetermined number of vehicle classes. The number of vehicle classes may also be determined by the clustering method itself, or statistical testing methods. Additionally, in some embodiments, after a first clustering operation is performed, a second clustering operation may be performed. For example, a set of vehicle classes created as a result of applying a first clustering operation may be further clustered (e.g., divided into additional vehicle classes) based on a geographical location of vehicles of the vehicle classes, or a type of operation (e.g., aggressive driving vs. cautious driving) of vehicles of the vehicle classes, or a different criterion.

In some embodiments, prior to clustering the vehicles, a dimensionality reduction may be applied to the set of features to reduce a total number of features used to establish vehicle classes. In other words, prior to clustering the parameter vectors, a dimensionality of the parameter vector may be reduced, whereby a lesser number of parameters may be included in the parameter vector. For example, a set of features may include 2000 features, from which 25 dominant features are selected via the dimensionality reduction. Reducing the number of parameters in the parameter vector may reduce a probability of modeling errors due to overfitting. Dimensionality reduction techniques may include principal component analysis (PCA), variational autoencoders (VAE), and the like.

At 806, method 800 includes learning a distribution for each partition. Each vehicle may be assigned a partition (e.g., vehicle class), and population-wide and partition-wide statistics may be collected, such as number of vehicles per partition, a population density of each partition, an average distance between vehicles in each partition and standard deviation, etc. Prior to a deployment of a relevant vehicle component and/or vehicle, vehicles of a vehicle class may belong to a same distribution. However, as vehicle components and data generating systems/subsystems may age differently, based on usage, over time the vehicles of the vehicle class may not belong to the same distribution. As a result, a local model of a vehicle component may drift with respect to a class-specific model of the vehicle class. One way of addressing the drift is to periodically update the local model based on parameters of the class-specific model, as described above in reference to method 500 of FIG. 5. Another way to address the drift is to periodically re-partition the vehicle population into vehicle classes as degradation and/or other vehicle data is collected.

At 808, method 800 includes, for each modeled component of the vehicle population, training a class-specific model (e.g., an RUL model) of the component for each vehicle class to learn a set of model parameters, using a previously defined, master model for all vehicles of the vehicle population. For example, a master RUL model may be associated with a fuel injector used by some vehicles of the vehicle population, and not used by other vehicles of the vehicle population. The master RUL model for the vehicle population may be used to create a plurality of class-specific RUL models, where each class-specific RUL model may be associated with a vehicle class that includes vehicles with the fuel injector.

For example, vehicles of a first vehicle class may include a first type of fuel injector, while vehicles of a second vehicle class may include a second type of fuel injector. The first vehicle class may have a first class-specific RUL model associated with the first type of fuel injector, and the second vehicle class may have a second class-specific RUL model associated with the second type of fuel injector. The first class-specific RUL model and the second class-specific RUL model may be stored in a cloud-based server, such as server system 401 of FIG. 4.

Referring briefly to FIG. 10A, a plot 1000 is shown depicting an example distribution of vehicles 1010 within four vehicle classes of a vehicle population. A first vehicle class 1002 may include a first class-specific RUL model 1014 for a vehicle component; a second vehicle class 1004 may include a second class-specific RUL model 1016 for the vehicle component; a third vehicle class 1006 may include a third class-specific RUL model 1018 for the vehicle component; and a fourth vehicle class 1008 may include a fourth class-specific RUL model 1020 for the vehicle component. The first vehicle class 1002, the second vehicle class 1004, the third vehicle class 1006, and the fourth vehicle class 1008 may be separated by one or more boundaries 1012.

Returning to FIG. 8, in some embodiments, different types of class-specific models may be used for different vehicle components. For example, a first model type may be used to model a first component, a second model type may be used to model a second component, a third model type may be used to model a third component, and so forth. Additionally, in some embodiments, a plurality of RUL models may be associated with a vehicle component, and a top-performing model may be selected and used. By generating the plurality of RUL models for each vehicle component, a model best suited for predicting an RUL of the vehicle component may be identified after the models are deployed.

In some embodiments, the plurality of RUL models may be periodically re-ranked based on a ranking algorithm and a new top-performing model of the plurality of RUL models may be selected. For example, a first top-performing RUL model may be selected prior to deployment, based on pre-deployment data; after a first time period after deployment, a second top-performing RUL model may be selected, based on a first batch of degradation data of the component received after deployment; after a second time period after deployment, a third top-performing RUL model may be selected, based on a second batch of degradation data of the component received after deployment; and so on. When a new RUL model is selected, the master RUL model, the class-specific models, and the local models may be updated to the new RUL model.

The class-specific RUL models may be trained using a class-specific training dataset with labeled data including ground truth information. The labeled data may be compiled by a manufacturer of the vehicle component associated with the class-specific RUL model, and may include, for example, engineering data (e.g., from engineering database 402 of FIG. 4), component testing data, and/or other data collected during a development of the vehicle component. The labeled data may also include degradation data received from vehicles of the connected vehicle population. For example, if a fuel injector of a vehicle degrades in the field, information about the degradation, the fuel injector, the vehicle, operating conditions of the vehicle, geographical location of the vehicle, and so forth may be transmitted to the cloud-based health monitoring system, where the information may be included in the labeled data for subsequent training purposes. However, because obtaining sufficient ground truth information may be difficult, after training on the labelled data, parameters of the class-specific RUL models may be further adjusted during subsequent training under an FL strategy, as described in greater detail in reference to FIG. 7.

Each of the class-specific RUL models for a given component may learn different parameters based on a corresponding class-specific training set. Specifically, a general RUL model may have the form:

$$\hat{y}(t) = f(s(t), \beta) \quad (2)$$

where y may represent an RUL. The function $f$ may map input vehicle samples $s(t)$ to a model output $y(t)$ at time t (t=1, ... T). The function $f$ is parameterized by $\beta$, which may be determined by minimizing a loss function defined by an error between a true state y and an estimated state $\hat{y} = f(s(t), \beta)$:

$$J = y - f(s(t), \beta) \quad (3)$$

For a fleet (population) of vehicles divided into M classes, to obtain optimal parameters for class models for the $m^{th}$ (m=1, ... M) vehicle class, one can write an optimization problem that minimizes the weighted sum of the loss function $J_m$ as shown below:

$$J_m^* = \min_{\beta_m} \frac{1}{T} \sum_{t=1}^{T} w_m(s(t)) J_m(\beta_m; s_m(t)) \quad (4)$$

where $\beta_m = [\beta_{m1}, \ldots, \beta_{mp}]$ are parameters for the class-specific models in the particular vehicle class, $s_m$ are training samples from the mth class, sampled at time t (t=1, ... , T), and the loss function $J_m$ is the error between the current class-level model and the true system behavior for the mth class. A weighting function $w_m$ is a vector defined as:

$$w_m(s(t)) = \exp\left(\frac{-dis(m, b(t))^2}{2\sigma^2}\right), dis(.,.) \quad (5)$$

which is a topological distance between two vehicle classes, which can be computed using a breadth-first procedure. The weighting function may smoothen discontinuities along boundaries of adjacent regions.

In turn, local RUL models may be trained iteratively via a mini-batch batch gradient descent starting from a point $\beta_m$ (learned from each class), where parameters are adjusted based on a function gradient with individual historical data:

$$\beta_m^{new} = \beta_m^{old} - \eta \nabla_{\beta_m} J_m(\beta_m; s_m) \quad (6)$$

where the parameters $\beta_m$ are updated in an opposite direction of the gradient of the loss function with respect to $\nabla_{\beta_m} J_m$. A step size $\eta$ may be a hyperparameter that dictates how fast convergence to a (local) minimum takes. A larger step size is likely to lead to a convergence faster, but may overshoot with unstable results. A smaller step size, on the other hand, may lead to very slow convergence. A common strategy to define the step size is to set it as a decreasing function of the number of updates.

A master RUL model F(t) for a vehicle component may be a summation of each class-specific RUL model of each vehicle class $C_m$, as described by equations (7) and (8) below:

$$F(t) = \sum_{m=1}^{M} v_m(s(t)) f_m(s(t)) \quad (7)$$

$$c_m(s(t)) = \begin{cases} 1 & s(t) \in C_m \\ 0 & \text{otherwise} \end{cases} \quad (8)$$

where m is a number of vehicle classes and $C_m$, m=1, ... , M is a disjoint partition of an operating space that contains the parameter vectors s(t) sampled at time t for a particular model, t is a signal sampling time, and m is the $m^{th}$ partition.

At 810, method 800 includes determining whether a class-specific RUL model error is greater than a threshold RUL model error. If at 810 it is determined that the class-specific RUL model error is greater than the threshold RUL model error, method 800 proceeds back to 804, where the vehicle population is repartitioned. As a result of a re-partitioning, one or more class boundaries of the vehicle classes may be adjusted based on the clustering methods.

Alternatively, if at 810 it is determined that the class-specific RUL model error is not greater than the threshold RUL model error, method 800 proceeds to 812. At 812, method 800 includes maintaining the existing vehicle classes, and method 800 ends.

Method 800 may be used to generate initial vehicle classes, but in some embodiments available ground truth degradation data may not be sufficient to use method 800 to generate optimal vehicle classes. A different, alternative procedure for generating vehicle classes that does not rely on ground truth data is described below in reference to FIG. 9.

Figure 9:
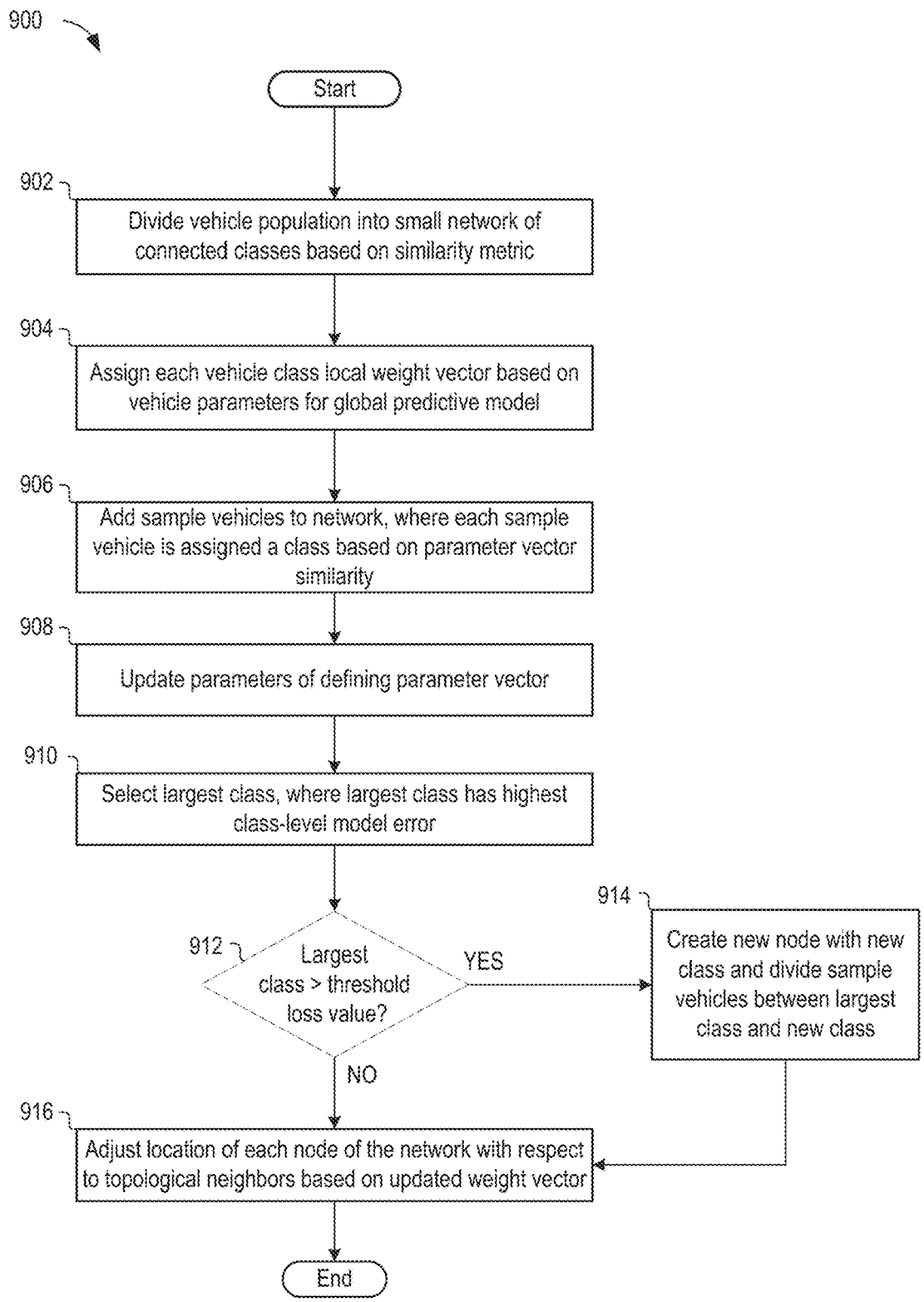
FIG. 9 is a flowchart that illustrates a second exemplary method for partitioning a vehicle population into vehicle classes.

FIG. 9 shows a second, alternative exemplary method 900 for partitioning a vehicle population into a plurality of vehicle classes using growing self-organizing maps (GSOM). By employing a GSOM algorithm, vehicle classes may be created based on prototypical high density parameter vectors that may be dynamically adjusted as new vehicles are added to the vehicle population and new data is received from vehicles of the vehicle population. Instructions for carrying out method 900 may be stored on and executed at a cloud-based server, such as the server system 401 of FIG. 4. Method 900 may be executed as part of method 500 described above.

Method 900 begins at 902, where method 900 includes dividing the vehicle population into a small network of connected vehicle classes based on a similarity metric, where each connected vehicle class is considered a node on the network. The vehicle classes may be specific to a vehicle component, where different vehicle classes are created for different components. As described above in reference to method 800, each vehicle of the vehicle population may be represented as a vector of vehicle parameters (e.g., vehicle data collected as part of method 500 above), and the similarity metric may be applied to cluster vehicles into initial classes. For example, a degree of similarity between vehicles may be established by calculating a Euclidean distance between the parameter vectors of the vehicles. In some embodiments, a subset of the vehicles of the vehicle population may be used to generate an initial set of vehicle classes, and a size and number of vehicle classes may be adjusted over time as a remainder of the vehicles of the vehicle population is incrementally added to the network of connected vehicle classes.

At 904, method 900 includes assigning each vehicle class a defining parameter vector based on vehicle parameters for a master predictive model. In one example the defining parameter vector may be a prototypical parameter vector of the vehicles of the respective vehicle class representing an average of the parameter vectors of the vehicles belonging to the vehicle class.

For example, the vehicle population may include a first vehicle class and a second vehicle class for a vehicle component. A first defining parameter vector of the first vehicle class may include a first parameter indicating a first vehicle type; a second parameter indicating a first vehicle year; a third parameter indicating a first vehicle size, and so on. A second defining parameter vector of the second vehicle class may include a first parameter indicating a second vehicle type; a second parameter indicating a second vehicle year; a third parameter indicating a second vehicle size, and so on. A vehicle with a parameter vector that is more similar to the first defining parameter vector than the second defining parameter vector may be assigned to the first vehicle class, while a vehicle with a parameter vector that is more similar to the second defining parameter vector than the first defining parameter vector may be assigned to the second vehicle class.

At 906, method 900 includes adding sample vehicles to the network of connected vehicle classes, where each sample vehicle is assigned a vehicle class based on parameter vector similarity, in the manner described above. In other words, in a competitive learning stage, vehicle classes compete with each other for sample vehicles based on a similarity and/or distance metric.

For example, a set of defining parameter vectors $\{\varepsilon_m, m=1, \ldots, M\}$, which determine a center location of a respective set of vehicle classes, may be adjusted with the recursive updating format:

$$\varepsilon_m(k+1) = \varepsilon_m(k) + \zeta_m(k) h(k, dis(m,b))[s - \varepsilon_m],$$
$$m = 1, \ldots, M \quad (9)$$

where dis(.,.) is a topological distance between two vehicle classes, which can be computed using a breadth-first procedure. c is a BMU—an index of the defining parameter vector closest to a training input s, while k is a number of updates of weight vectors over a fixed number of vehicle classes. A maximum number for k is predefined to stop updating of defining parameter vectors.

For each input s(t) at a given sampling time t, a corresponding BMU b(t) will be determined by:

$$b(t) = \underset{m}{\arg\min} \|s(t) - \varepsilon_m\| \quad (10)$$

A matching process of the input s and the BMU c indicates the competitive learning capability of the growing SOM method. Vehicle classes compete with each other to win sampling data.

At 908, each time a sample vehicle is added to a class, method 900 includes updating the parameters of the defining parameter vector based on the parameters of the added sample vehicle (e.g., in a cooperative learning stage). For example, if the defining parameter vector is calculated based on an average of the parameter vectors of the vehicles in the vehicle class, updating the parameters of the defining parameter vector may include recalculating the average of the parameter vectors of the vehicles in the vehicle class including a new parameter vector of the added sample vehicle.

In some embodiments, cooperative learning may involve using a neighborhood function h (k,dis(m,b)) defined with a Gaussian kernel, as:

$$h(k, dis(m, b)) = \exp\left(\frac{-dis(m, b)^2}{2\sigma^2(k)}\right) \quad (11)$$

where σ is a non-increasing function of time defining an effective range of the neighborhood function. The use of the neighborhood function activates cooperative learning, enabling a defining parameter vector to be updated with training data falling into the corresponding vehicle class (e.g., Voronoi set), and also training data in neighboring vehicle classes.

At 910, method 900 includes selecting a largest vehicle class, where the largest vehicle class is the vehicle class with a highest class-level model error (e.g., degree of divergence in a population distribution of vehicles of the vehicle class). In other words, as new sample vehicle data is added to a vehicle class of the network, a population distribution of vehicles in the vehicle class may shift from a first population distribution to a second population distribution. The second population distribution may be substantially similar to the first population distribution, or the second population distribution may be divergent with the first population distribution. A divergent population distribution may indicate an increasing heterogeneity of the vehicle class, due to growing variances and/or shifting means within the vehicle class.

Referring briefly to FIG. 10B, a divergence example diagram 1030 is shown including a first graph 1032 and a second graph 1034. The first graph 1032 shows a first population distribution plot 1036 of a predicted RUL of a vehicle component across a plurality of RUL models of a respective plurality of vehicles of a vehicle class. The second graph 1034 shows a second population distribution 1038 of a predicted RUL of the vehicle component across the plurality of RUL models of the respective plurality of vehicles of the vehicle class, superimposed on the first population distribution plot 1036, where the second population distribution is a result of adding new sample data 1040 (e.g., degradation data, new vehicle data, etc.) to the vehicle class. In the second graph 1034, a divergence 1042 can be seen. The divergence 1042 may indicate a presence of two sub-populations of vehicles of the vehicle class. For example, the divergence 1042 may occur as a result of an introduction of changes to a vehicle component by a manufacturer of the vehicle component, whereby vehicles including the vehicle component with the changes may have an RUL that is shorter than vehicles including the vehicle component without the changes. As a result of the occurrence of the divergence 1042, the vehicle class may be divided into two vehicles classes (e.g., the vehicle class and a new vehicle class). Alternatively, if no divergence is detected in the first population distribution and the second population distribution, the vehicle class may not be divided into two vehicles classes.

Returning to FIG. 9, at 912, at the 900 includes determining whether the class-specific RUL model error (e.g., loss value) of the largest vehicle class is greater than a threshold loss value. If at 912 it is determined that the class-specific RUL model error of the largest class is greater than the threshold loss value, method 900 proceeds to 914. Alternatively, if at 912 it is determined that the class-specific RUL model error of the largest class is not greater than a threshold loss value, method 900 proceeds to 916.

At 914, method 900 includes creating a new vehicle class (e.g., a new node on the network) and dividing the vehicles of the largest class between the new vehicle class and the formerly largest vehicle class, in an adaptive learning stage. For example, vehicles with parameter vectors most similar to a defining parameter vector of the largest vehicle class may remain in the formerly largest vehicle class, while vehicles with parameter vectors most similar to a defining parameter vector of the new vehicle class may be assigned to the new vehicle class.

For example, a penalty term $\zeta_m(k)$ may be determined by a value of a local loss function $J_m$ established for class-specific RUL model parameter identification. The increment of $\zeta_m$ will lead to a parameter vector to move toward regions with higher loss functions. Thus, the GSOM network is grown based on the value of the loss function instead of visiting frequency or quantization errors. The penalty term is described as follows:

$$\zeta_m(k) = \frac{J_m(k)}{\sum_{m=1}^{M} J_m(k)} \qquad (12)$$

If a largest $\zeta_m$ exceeds a predefined threshold, a new vehicle class may be inserted between a vehicle class with the largest $\zeta_m$ and a furthest neighbor based on Euclidean distance. This will lead to a finer partition of the vehicle class that cannot be sufficiently described by current local model and requires further decomposition. Growth of the GSOM network may be terminated based on a first stopping criterion, where all $\zeta_m$, m=1, ..., M are below the predefined threshold, or a second stopping criterion, where a number of SOM nodes (number of vehicle classes) exceeds a predefined number.

At 916, method 900 includes adjusting a location of each node of the network with respect to topologically neighboring nodes (e.g., neighboring vehicle classes) by updating the defining parameter vectors of the vehicle classes in the network. As the defining parameter vectors of the vehicle classes in the network are adjusted based on an addition of a new sample vehicle and/or a creation of a new node, An example of the process of creation of the new vehicle class and the division of the vehicles of the largest vehicle class into the new vehicle class and the formerly largest vehicle class is depicted in FIG. 10C.

Figure 10C:
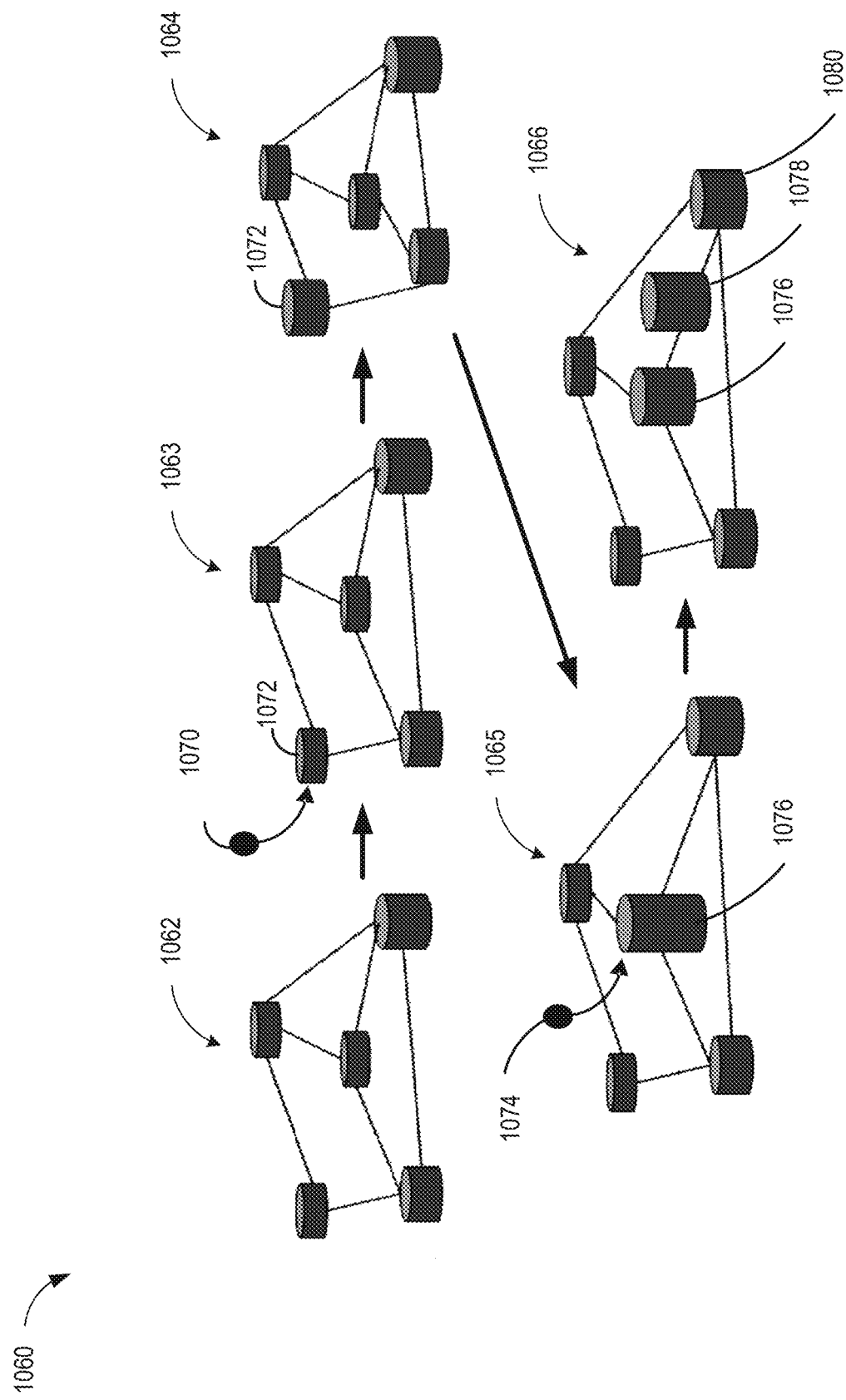
FIG. 10C shows how vehicle subclasses are adjusted based on new sample degradation data using unsupervised learning.
Figure 11:
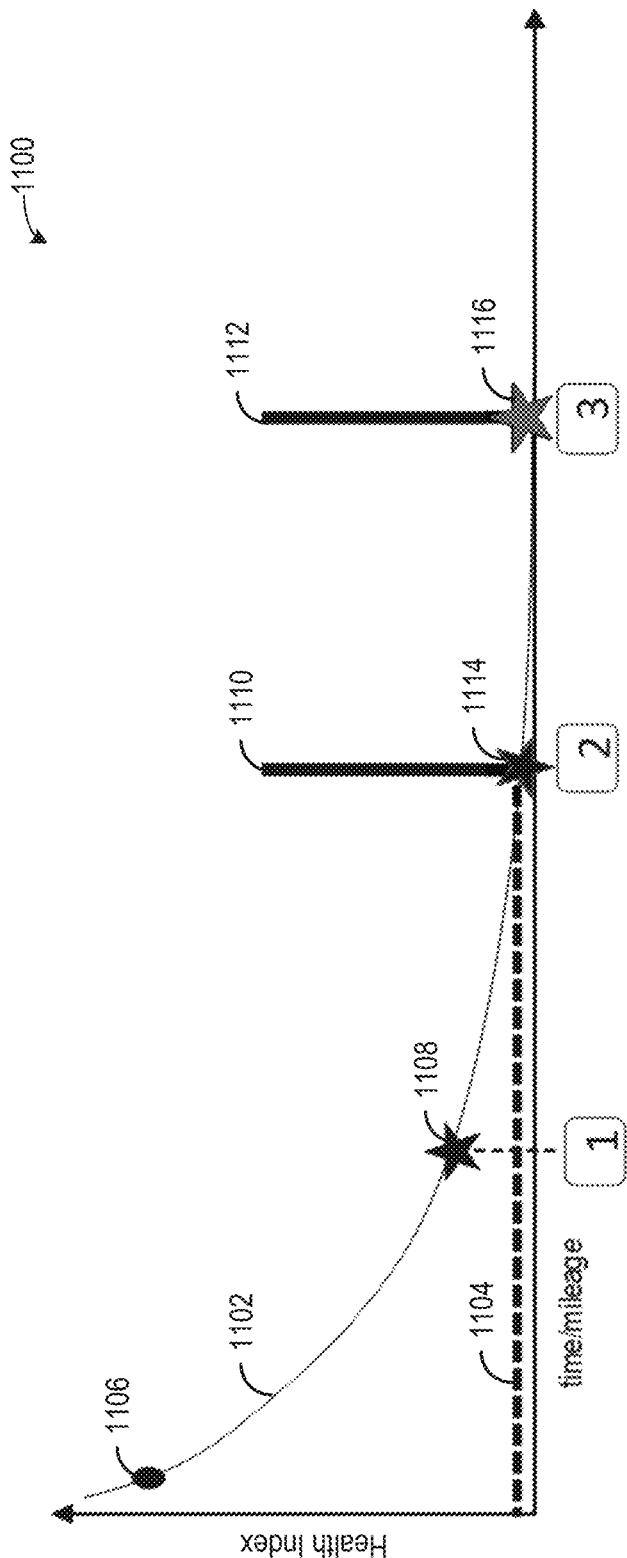
FIG. 11 is a graph that shows a decrease in a health index of a vehicle component over a lifetime of the vehicle component.

Referring briefly to FIG. 10C, a sequence diagram 1060 shows five states of a network at five different subsequent points in time during an application of a GSOM algorithm: a first state 1062, a second state 1063, a third state 1064, a fourth state 1065, and a fifth state 1066. The network represents a vehicle population and includes five nodes, where each of the five nodes represents a vehicle class of the vehicle population. In the first state 1062, each of the five nodes is depicted as having a different size, as each vehicle class may include a different number of vehicles.

In the second state 1063, a new sample vehicle 1070 is added to a vehicle class of the network at a node 1072. When the new sample vehicle 1070 is added to the vehicle class of the network at a node 1072, a size of the node 1072 increases to reflect the addition, as shown in the third state 1064. Additionally, a topology of the network is adjusted, shown by changes in distances between the nodes, as a defining parameter vector of the node 1072 and associated vehicle class is adjusted based on an inclusion of the new sample vehicle 1070. A class-specific RUL model error of the vehicle class represented by node 1072 may be calculated, based on RUL model predictions from each vehicle of the vehicle class represented by node 1072. As a result of the class-specific RUL model error of the vehicle class not exceeding a threshold loss value, a new node is not created.

The fourth state 1065 shows the network at a later stage in time, when a new sample vehicle 1074 is added to a vehicle class represented by node 1076. When the new sample vehicle 1074 is added, the GSOM algorithm detects that node 1076 is the largest node of the network, and further detects that a class-specific RUL model error of the vehicle class represented by node 1076 exceeds the threshold loss value. As a result of the class-specific RUL model error exceeding the threshold loss value, a new vehicle class is created, represented by a new node 1078. The new node 1078 is inserted between node 1076 and a farthest node from node 1076, node 1080. As shown in the fifth state 1066, a number of vehicles of the vehicle class represented by node 1076 may then be divided between node 1076 and the new node 1078, where vehicles with parameter vectors most similar to a defining parameter vector of node 1076 remain in the vehicle class represented by node 1076, and where vehicles with parameter vectors most similar to a defining parameter vector of the new node 1078 may be assigned to the vehicle class represented by the new node 1078. After the vehicles of node 1076 have been divided between node 1076 and node 1078, the topology of the network is adjusted, shown by changes in distances between the nodes in state 1066, based on a recalculation of vehicle similarity within vehicle classes and vehicle class size.

Thus, data from a connected vehicle population may be used to increase an accuracy of RUL models of a vehicle component of the connected vehicle population. A cloud-based health monitoring system may divide the connected vehicle population into a plurality of vehicle classes based on a similarity or distance metric, where each vehicle class has a class-specific RUL model that predicts the RUL of the vehicle component of the respective vehicle class. The class-specific RUL model may be created using clustering methods, and initially trained using ground truth degradation data of the respective vehicle class. The class-specific RUL model may be subsequently updated as degradation data is collected by vehicles of the vehicle class via an FL strategy, whereby local RUL model data may be iteratively requested from randomly selected portions of vehicles of the respective vehicle class and used to update parameters of the class-specific RUL model. The parameters may in turn be sent back to the randomly selected portion of vehicles of the respective vehicle class to update local RUL models of the randomly selected portion of vehicles. By splitting the connected vehicle population in to vehicle classes and training separate, class-specific RUL models, and using an output of the class specific RUL models to update parameters of local RUL models and/or a master RUL model for the connected vehicle population, accurate RULs may be generated at a vehicle level, a class level, and a vehicle population level. As a result, component degradations at vehicles may be more accurately predicted, leading to a reduced number of total degradations in the field, and improved management of a total population of components.

The technical effect of partitioning a vehicle population into vehicle classes, and training and updating class-specific RUL models using an FL strategy with connected vehicle data is that an accuracy of RUL models may be increased at a vehicle level, a class level, and a vehicle population level.

The disclosure also provides support for a method, comprising: dividing a population of vehicles of a connected vehicle population into a plurality of vehicle classes, for each vehicle class of the plurality of vehicle classes, training a class-specific model of the vehicle class to predict a health status variable of a vehicle component included in the vehicle class based on labelled data from historic databases and calibration data, and for each vehicle class of the plurality of vehicle classes, using a first Federated Learning (FL) strategy to: request local model data from each vehicle of a plurality of vehicles of the vehicle class, receive the local model data from the plurality of vehicles, update the class-specific model of the vehicle class based on the received local model data, and send updated parameters of the updated, class-specific model to vehicles included in the vehicle class and further send instructions to retrain local models of the vehicles with the updated parameters. In a first example of the method, the class-specific model of the vehicle class is a remaining useful life (RUL) model that predicts an RUL of the vehicle component included in the vehicle class. In a second example of the method, optionally including the first example, the vehicle class is defined based on vehicle data including one or more of a vehicle similarity criterion, a vehicle model, a vehicle feature package, a geographical region, an operating condition, a type of vehicle usage, and a driver behavior. In a third example of the method, optionally including one or both of the first and second examples, the method further comprises: generating the plurality of vehicle classes by: assigning vehicle parameter vectors to vehicles of the connected vehicle population based on the vehicle data, applying a clustering algorithm to the vehicle parameter vectors to partition the connected vehicle population into a set of vehicle classes, and after updating parameters of a class-specific RUL model of a vehicle class based on local RUL model data of a plurality of vehicles of the vehicle class, in response to an error of the class-specific RUL model exceeding a threshold error, repartitioning the connected vehicle population into the set of vehicle classes by applying the clustering algorithm to the updated vehicle parameter vectors. In a fourth example of the method, optionally including one or more or each of the first through third examples, the plurality of vehicle classes are generated based on a growing self-organized maps (GSOM) algorithm comprising: dividing the connected vehicle population into a small network of vehicle classes, each vehicle class based on a defining parameter vector of the vehicle class, assigning each vehicle of the connected vehicle population to a vehicle class based on a proximity of a vehicle parameter vector of the vehicle to the defining parameter vector of the vehicle class, calculating a first statistic of each vehicle class, in response to a new vehicle being added to a selected vehicle class of the network, calculating a second statistic of the selected vehicle class, and in response to a difference between the second statistic of the selected vehicle class and the first statistic of the selected vehicle class exceeding a threshold value: creating a new vehicle class, assigning each vehicle of the selected vehicle class to either the selected vehicle class or the new vehicle class, based on a relative proximity of the vehicle parameter vector of each vehicle of the selected vehicle class to either the defining parameter vector of the selected vehicle class or the defining parameter vector of the new vehicle class, respectively, and recalculating a defining parameter vector of each vehicle class. In a fifth example of the method, optionally including one or more or each of the first through fourth examples, the statistic is a vehicle population distribution of the vehicle class, and the threshold value is a threshold dissimilarity between the vehicle population distribution of the selected vehicle class and the vehicle population distribution of the new vehicle class calculated based on a distance metric. In a sixth example of the method, optionally including one or more or each of the first through fifth examples, using the first FL strategy to update the class-specific model of the vehicle class and send the updated, class-specific model to the vehicles included in the vehicle class further comprises: performing an FL learning session including a plurality of FL learning cycles, each FL learning cycle comprising: iteratively adjusting parameters of the class-specific RUL model based on data from local RUL models of a random subset of vehicles of the vehicle class, and sending the adjusted parameters of the class-specific RUL model to the random subset of vehicles to retrain the local RUL models at the random subset of vehicles based on the adjusted parameters of the class-specific RUL model, until the parameters of the class-specific RUL models converge. In a seventh example of the method, optionally including one or more or each of the first through sixth examples, iteratively adjusting parameters of the class-specific RUL model based on data from local RUL models of a random subset of vehicles further comprises aggregating local RUL model data and generating updated parameters of the class-specific RUL model from the aggregated local RUL model data. In an eighth example of the method, optionally including one or more or each of the first through seventh examples, the class-specific model is stored in a cloud-based health monitoring system wirelessly connected to the connected vehicle population. In a ninth example of the method, optionally including one or more or each of the first through eighth examples, a master RUL model of the vehicle component of the connected vehicle population is updated by: training the master RUL model on an initial training dataset including ground truth degradation data of the vehicle component, creating a set of learning federations, each learning federation including local RUL models drawn from vehicles of the connected vehicle population in accordance with a sampling strategy, and applying a second FL strategy to the set of learning federations to update the master RUL model. In a tenth example of the method, optionally including one or more or each of the first through ninth examples, the ground truth degradation data includes at least one of sensor data from vehicles of the connected vehicle population, degradation data of the vehicle component, and repair data of the vehicle component. In a eleventh example of the method, optionally including one or more or each of the first through tenth examples, the sampling strategy includes at least one of: a stratified sampling strategy, where samples are drawn from homogeneous groups of vehicles of the connected vehicle population, a cluster sampling strategy, where samples are drawn from heterogeneous clusters of the vehicles of the connected vehicle population, and a mixed sampling strategy, where samples are drawn from heterogeneous clusters of a homogeneous group of the vehicles of the connected vehicle population. In a twelfth example of the method, optionally including one or more or each of the first through eleventh examples, applying the second FL strategy to the set of learning federations to update the master RUL model includes averaging parameters of the master RUL model across a plurality of learning federations.

The disclosure also provides support for a method for a vehicle, comprising: in response to detecting a degradation of a component of the vehicle, sending a first notice of service to a driver of the vehicle, updating a local remaining useful life (RUL) model of the component based on degradation data, based on an RUL predicted by the local RUL model, sending a request to a cloud-based health monitoring system to initiate Federated Learning (FL), and in response to receiving parameters of a class-specific RUL model of the component associated with a vehicle class of the vehicle from the cloud-based health monitoring system, updating local parameters of the local RUL model of the component based on the received parameters, and retraining the local RUL based on historical data of the vehicle. In a first example of the method, in a first condition where the predicted RUL of the component is greater than a minimum RUL, the request to initiate FL is sent, and in a second condition where the predicted RUL of the component is not greater than the minimum RUL, the request to initiate FL is not sent. In a second example of the method, optionally including the first example, updating the local parameters of the local RUL model of the component based on the received parameters further comprises either replacing the local parameters of the local RUL model with the received parameters or generating new parameters of the local RUL model as a function of previous parameters of the local RUL model and the received parameters.

The disclosure also provides support for a system, comprising: a population of vehicle components of a connected vehicle population, a cloud-based server wirelessly connected to the population of vehicle components, the cloud-based server including a processor and instructions stored on non-transient memory that, when executed, cause the processor to: in response to receiving a request to initiate Federated Learning (FL) from a vehicle of the connected vehicle population due to a degradation detected in a vehicle component of the vehicle: initiate an FL session to update parameters of a class-specific RUL model of a class of the vehicle component, based on aggregated data of a plurality of local RUL models of vehicle components of vehicles of the class of the vehicle component, and transmit data of the updated class-specific RUL model to the vehicles of the class of the vehicle component, the data including an updated predicted class-based RUL of the vehicle component. In a first example of the system, the aggregated data of the plurality of local RUL models includes at least one of parameters of the local RUL models, inputs to the local RUL models, outputs of the RUL models, and errors of the local RUL models. In a second example of the system, optionally including the first example, initiating the FL session to update the parameters of the class-specific RUL model of the class of the degraded vehicle component and sending the updated parameters of the class-specific RUL model to vehicles further comprises, for each FL cycle of a plurality of FL cycles of the FL session, creating a learning federation including a pre-defined random number of vehicles of the class, updating parameters of the class-specific RUL model based on the aggregated data of the plurality of local RUL models of the learning federation, transmitting the updated parameters of the class-specific RUL model to the vehicles of the learning federation for updating parameters of the local RUL models, and terminating the FL session when the parameters of the class-specific RUL model converge with the parameters of the local RUL models to within a threshold convergence. In a third example of the system, optionally including one or both of the first and second examples, updating parameters of the class-specific RUL model based on the aggregated data of the plurality of local RUL models of the learning federation further comprises training the class-specific RUL model to minimize a weighted sum of prediction errors of the local RUL models.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
dividing a population of vehicles of a connected vehicle population into a plurality of vehicle classes;
for each vehicle class of the plurality of vehicle classes, training a class-specific model of the vehicle class to predict a health status variable of a vehicle component included in the vehicle class based on labelled data from historic databases and calibration data; and
for each vehicle class of the plurality of vehicle classes, using a first Federated Learning (FL) strategy to:
request local model parameter data from a respective local model of each vehicle of a plurality of vehicles of the vehicle class, the local model parameter data including model inputs, model outputs, model error, and/or weights and biases of each local model;
receive the local model parameter data from the plurality of vehicles;
update the class-specific model of the vehicle class based on the received local model parameter data; and
send updated parameters of the updated, class-specific model to vehicles included in the vehicle class and further send instructions to retrain local models of the vehicles with the updated parameters, wherein the vehicle class is defined based on a driver driving style, and wherein different class-specific models are used for drivers of different driving styles.

2. The method of claim 1, wherein the class-specific model of the vehicle class is a remaining useful life (RUL) model that predicts an RUL of the vehicle component included in the vehicle class.

3. The method of claim 2, wherein the vehicle class is further defined based on vehicle data including a vehicle feature package and a geographical region, and wherein the driving style includes a first sub-class of drivers who have an aggressive or impatient driving style and a second sub-class of drivers who have a cautious driving style.

4. The method of claim 3, further comprising:
generating the plurality of vehicle classes by:
assigning vehicle parameter vectors to vehicles of the connected vehicle population based on the vehicle data;
applying a clustering algorithm to the vehicle parameter vectors to partition the connected vehicle population into a set of vehicle classes; and
after updating parameters of a class-specific RUL model of a vehicle class based on local RUL model parameter data of a plurality of vehicles of the vehicle class, in response to an error of the class-specific RUL model exceeding a threshold error, repartitioning the connected vehicle population into the set of vehicle classes by applying the clustering algorithm to the updated vehicle parameter vectors.

5. The method of claim 3, wherein the plurality of vehicle classes are generated based on a growing self-organized maps (GSOM) algorithm comprising:
dividing the connected vehicle population into a small network of vehicle classes, each vehicle class based on a defining parameter vector of the vehicle class,
assigning each vehicle of the connected vehicle population to a vehicle class based on a proximity of a vehicle parameter vector of the vehicle to the defining parameter vector of the vehicle class;
calculating a first statistic of each vehicle class;
in response to a new vehicle being added to a selected vehicle class of the network:
calculating a second statistic of the selected vehicle class; and
in response to a difference between the second statistic of the selected vehicle class and the first statistic of the selected vehicle class exceeding a threshold value:
creating a new vehicle class;
assigning each vehicle of the selected vehicle class to either the selected vehicle class or the new vehicle class, based on a relative proximity of the vehicle parameter vector of each vehicle of the selected vehicle class to either the defining parameter vector of the selected vehicle class or the defining parameter vector of the new vehicle class, respectively; and
recalculating a defining parameter vector of each vehicle class.

6. The method of claim 5, wherein the statistic is a vehicle population distribution of the vehicle class, and the threshold value is a threshold dissimilarity between the vehicle population distribution of the selected vehicle class and the vehicle population distribution of the new vehicle class calculated based on a distance metric.

7. The method of claim 2, wherein using the first FL strategy to update the class-specific model of the vehicle class and send the updated, class-specific model to the vehicles included in the vehicle class further comprises:
performing an FL learning session including a plurality of FL learning cycles, each FL learning cycle comprising:
iteratively adjusting parameters of the class-specific RUL model based on model parameter data from local RUL models of a random subset of vehicles of the vehicle class, and sending the adjusted parameters of the class-specific RUL model to the random subset of vehicles to retrain the local RUL models at the random subset of vehicles based on the adjusted parameters of the class-specific RUL model, until the parameters of the class-specific RUL models converge.

8. The method of claim 7, wherein iteratively adjusting parameters of the class-specific RUL model based on the model parameter data from local RUL models of a random subset of vehicles further comprises aggregating local RUL model parameter data and generating updated parameters of the class-specific RUL model from the aggregated local RUL model parameter data.

9. The method of claim 2, wherein a master RUL model of the vehicle component of the connected vehicle population is updated by:
training the master RUL model on an initial training dataset including ground truth degradation data of the vehicle component;

creating a set of learning federations, each learning federation including local RUL models drawn from vehicles of the connected vehicle population in accordance with a sampling strategy; and applying a second FL strategy to the set of learning federations to update the master RUL model.

10. The method of claim 9, where the ground truth degradation data includes at least one of sensor data from vehicles of the connected vehicle population, degradation data of the vehicle component, and repair data of the vehicle component.

11. The method of claim 9, where the sampling strategy includes at least one of:
a stratified sampling strategy, where samples are drawn from homogeneous groups of vehicles of the connected vehicle population;
a cluster sampling strategy, where samples are drawn from heterogeneous clusters of the vehicles of the connected vehicle population; and
a mixed sampling strategy, where samples are drawn from heterogeneous clusters of a homogeneous group of the vehicles of the connected vehicle population.

12. The method of claim 9, wherein applying the second FL strategy to the set of learning federations to update the master RUL model includes averaging parameters of the master RUL model across a plurality of learning federations.

13. The method of claim 1, wherein the class-specific model is stored in a cloud-based health monitoring system wirelessly connected to the connected vehicle population.

14. A method for a vehicle, comprising:
in response to detecting a degradation of a component of the vehicle:
sending a first notice of service to a driver of the vehicle;
updating a local remaining useful life (RUL) model of the component based on degradation data;
based on an RUL predicted by the local RUL model, sending a request to a cloud-based health monitoring system to initiate Federated Learning (FL); and
in response to receiving parameters of a class-specific RUL model of the component associated with a vehicle class of the vehicle from the cloud-based health monitoring system, the parameters generated based on training the class-specific RUL model using aggregated parameter data of local RUL models of a plurality of vehicles, updating local parameters of the local RUL model of the component based on the received parameters; and
retraining the local RUL based on historical data of the vehicle, wherein the vehicle class is defined based on a driver driving style, wherein different class-specific models are used for drivers of different driving styles, and wherein the driving style includes a first sub-class of drivers who have an aggressive or impatient driving style and a second sub-class of drivers who have a cautious driving style.

15. The method of claim 14, wherein:
in a first condition where the predicted RUL of the component is greater than a minimum RUL, the request to initiate FL is sent; and
in a second condition where the predicted RUL of the component is not greater than the minimum RUL, the request to initiate FL is not sent.

16. The method of claim 14, wherein updating the local parameters of the local RUL model of the component based on the received parameters further comprises either replacing the local parameters of the local RUL model with the received parameters or generating new parameters of the local RUL model as a function of previous parameters of the local RUL model and the received parameters.

17. A system, comprising:
a population of vehicle components of a connected vehicle population;
a cloud-based server wirelessly connected to the population of vehicle components, the cloud-based server including a processor and instructions stored on non-transient memory that, when executed, cause the processor to:
in response to receiving a request to initiate class-specific Federated Learning (FL) from a vehicle of the connected vehicle population due to a degradation detected in a vehicle component of the vehicle:
initiate an FL session to update parameters of a class-specific RUL model of a class of the vehicle component, based on aggregated parameter data of a plurality of local RUL models of vehicle components of vehicles of the class of the vehicle component, the parameter data including weights and biases of the plurality of local RUL models; and
transmit data of the updated class-specific RUL model to the vehicles of the class of the vehicle component, the data including an updated predicted class-based RUL of the vehicle component.

18. The system of claim 17, wherein the aggregated parameter data of the plurality of local RUL models includes at least one of:
inputs to the local RUL models;
outputs of the RUL models; and
errors of the local RUL models.

19. The system of claim 17, wherein initiating the FL session to update the parameters of the class-specific RUL model of the class of the degraded vehicle component and sending the updated parameters of the class-specific RUL model to vehicles further comprises:
for each FL cycle of a plurality of FL cycles of the FL session:
creating a learning federation including a pre-defined random number of vehicles of the class;
updating parameters of the class-specific RUL model based on the aggregated parameter data of the plurality of local RUL models of the learning federation;
transmitting the updated parameters of the class-specific RUL model to the vehicles of the learning federation for updating parameters of the local RUL models; and
terminating the FL session when the parameters of the class-specific RUL model converge with the parameters of the local RUL models to within a threshold convergence.

20. The system of claim 19, wherein updating parameters of the class-specific RUL model based on the aggregated parameter data of the plurality of local RUL models of the learning federation further comprises training the class-specific RUL model to minimize a weighted sum of prediction errors of the local RUL models.

* * * * *